(12) United States Patent
Hoshi

(10) Patent No.: US 9,843,056 B2
(45) Date of Patent: Dec. 12, 2017

(54) FUEL CELL SYSTEM AND METHOD FOR CONTROLLING FUEL CELL SYSTEM

(71) Applicant: NISSAN MOTOR CO., LTD., Yokohama-shi, Kanagawa (JP)

(72) Inventor: Kiyoshi Hoshi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/027,402

(22) PCT Filed: Sep. 10, 2014

(86) PCT No.: PCT/JP2014/073961
§ 371 (c)(1),
(2) Date: Apr. 5, 2016

(87) PCT Pub. No.: WO2015/053034
PCT Pub. Date: Apr. 16, 2015

(65) Prior Publication Data
US 2016/0254554 A1    Sep. 1, 2016

(30) Foreign Application Priority Data

Oct. 8, 2013  (JP) ................................ 2013-211335

(51) Int. Cl.
*H01M 8/04082* (2016.01)
*H01M 8/0662* (2016.01)
*H01M 8/04537* (2016.01)
*H01M 8/04746* (2016.01)
(Continued)

(52) U.S. Cl.
CPC ... *H01M 8/04082* (2013.01); *H01M 8/04089* (2013.01); *H01M 8/04291* (2013.01); *H01M 8/04559* (2013.01); *H01M 8/04574* (2013.01); *H01M 8/04589* (2013.01); *H01M 8/04753* (2013.01); *H01M 8/0662* (2013.01); *H01M 2250/20* (2013.01); *Y02T 90/32* (2013.01)

(58) Field of Classification Search
CPC ...................... H01M 8/04753; H01M 8/04559
See application file for complete search history.

(56) References Cited

U.S. PATENT DOCUMENTS

| 2003/0157383 A1* | 8/2003 | Takahashi | H01M 8/04089 |
| | | | 429/411 |
| 2008/0091629 A1* | 4/2008 | Matsumoto | H01M 8/04223 |
| | | | 706/14 |

FOREIGN PATENT DOCUMENTS

JP    2000-357526 A    12/2000

* cited by examiner

*Primary Examiner* — Olatunji Godo
(74) *Attorney, Agent, or Firm* — Foley & Lardner LLP

(57) ABSTRACT

A fuel cell system supplies anode gas and cathode gas to a fuel cell and causes the fuel cell to generate electric power in accordance with a load. The fuel cell system includes a container reserved impurities discharged from the fuel cell. The fuel cell system includes a pressure control unit that makes a pressure of the anode gas higher when a current of the fuel cell is high than when the current of the fuel cell is low. The fuel cell system includes an estimation unit that varies the current of the fuel cell, and estimates a current-voltage characteristic of the fuel cell on the basis of a current value and a voltage value obtained when the current of the fuel cell has been varied. The fuel cell system includes a restriction unit that, while the estimation unit is estimating the current-voltage characteristic, restricts a reduction in the pressure of the anode gas.

9 Claims, 10 Drawing Sheets

(51) Int. Cl.
*H01M 8/04089* (2016.01)
*H01M 8/04291* (2016.01)

FUEL CELL SYSTEM AND METHOD FOR CONTROLLING FUEL CELL SYSTEM

TECHNICAL FIELD

The present invention relates to a fuel cell system that estimates the current-voltage characteristic of a fuel cell, and to a method of controlling the fuel cell system.

BACKGROUND ART

There is a fuel cell system that estimates the current-voltage (I-V) characteristic of a fuel cell by detecting an output voltage while varying an output current of the fuel cell (see JP 2000-357526A).

SUMMARY OF INVENTION

In fuel cell systems that are currently developed, impurities retained in anode gas flow passages in a fuel cell, such as nitrogen gas and water, are discharged to a buffer tank provided in an anode gas discharge passage. Consequently, impurities that are present in electric power generation regions in the fuel cell decrease, and hence a decline in the efficiency of electric power generation by the fuel cell is suppressed.

Such fuel cell systems may be activated in an environment of a subzero temperature. In this case, as the I-V characteristic of the fuel cell worsens compared to the case of normal operation, whether the I-V characteristic of the fuel cell has been restored to the state where electric power can be supplied to a driving motor is regularly checked.

Regarding the estimation of the I-V characteristic, current control is performed to provide the output current extracted from the fuel cell with an amplitude within a certain range, and the current and voltage of the fuel cell are obtained from corresponding sensors sequentially when the output current has the amplitude. Then, the I-V characteristic of the fuel cell is estimated on the basis of the obtained current and voltage values.

Meanwhile, the anode gas pressure is controlled in such a manner that the higher the output current of the fuel cell, the higher the anode gas pressure. In this way, when the output current is low, a stress applied to membranes in the fuel cell due to a pressure difference between the pressure of cathode gas and the anode gas pressure is reduced.

However, in the fuel cell systems that cause impurities to be discharged to the buffer tank, a reduction in the anode gas pressure associated with current control in the I-V estimation causes a backflow of impurities from the buffer tank to the fuel cell, and hence an increase in the concentration of impurities inside the electric power generation regions. As a result, the efficiency of electric power generation by the fuel cell declines, and the voltage of the fuel cell detected by a sensor falls below an intended voltage value. This lowers the precision of estimation of the I-V characteristic.

The present invention has been made in view of the above problems, and aims to provide a fuel cell system that discharges impurities retained in a fuel cell to a container and suppresses a decline in the precision of estimation of the I-V characteristic associated with a backflow of impurities, as well as a method of controlling the fuel cell system.

According to one aspect of the present invention, a fuel cell system is configured to supply anode gas and cathode gas to a fuel cell and cause the fuel cell to generate electric power in accordance with a load. The fuel cell system includes a container configured to reserve impurities discharged from the fuel cell, a pressure control unit configured to make a pressure of the anode gas higher when a current of the fuel cell is high than when the current of the fuel cell is low, and an estimation unit configured to vary the current of the fuel cell, and estimate a current-voltage characteristic of the fuel cell on the basis of a current value and a voltage value obtained when the current of the fuel cell has been varied. The fuel cell system includes a restriction unit configured to, while the estimation unit is estimating the current-voltage characteristic, restrict a reduction made by the pressure control unit in the pressure of the anode gas.

DESCRIPTION OF EMBODIMENTS

Embodiments of the present invention will be described below with reference to the drawings and the like.
(First Embodiment)

Figure 1:
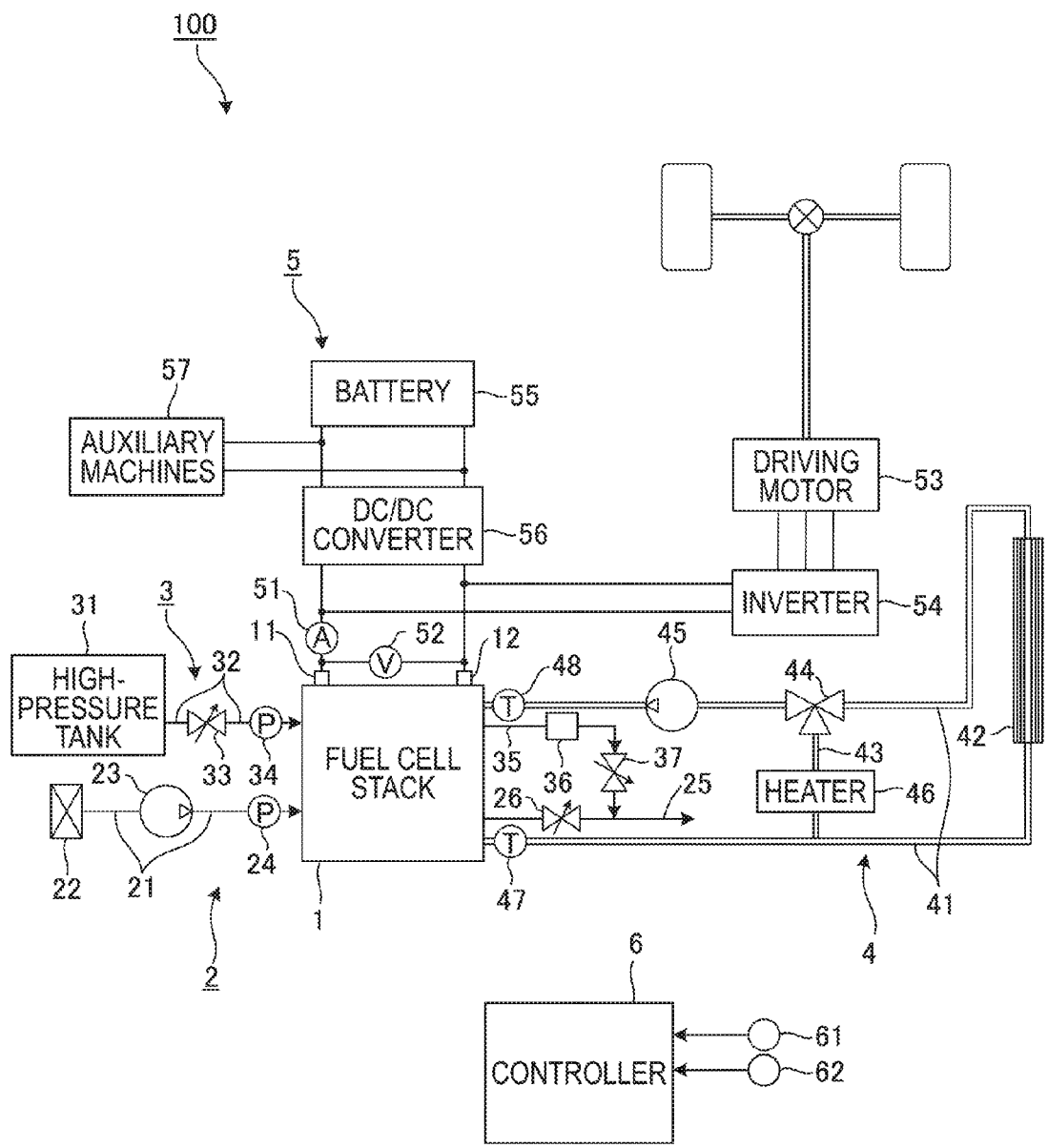
FIG. 1 is a configuration diagram showing a fuel cell system according to a first embodiment of the present invention.

FIG. 1 shows a configuration of a fuel cell system 100 according to a first embodiment of the present invention.

The fuel cell system 100 is a power supply system that supplies cathode gas and anode gas from outside to a fuel cell stack 1, and causes the fuel cell stack 1 to generate electric power in accordance with loads. In the present embodiment, the fuel cell system 100 supplies the electric power generated by the fuel cell stack 1 to the loads, such as a driving motor 53.

The fuel cell system 100 includes the fuel cell stack 1, a cathode gas supply/discharge apparatus 2, an anode gas supply/discharge apparatus 3, a stack cooling apparatus 4, an electric power system 5, and a controller 6.

The fuel cell stack 1 is a stacked battery made by stacking several hundred fuel cells (so-called battery cells). The fuel cell stack 1 generates electric power using anode gas and cathode gas supplied thereto. The fuel cell stack 1 has an anode electrode output terminal 11 and a cathode electrode output terminal 12 as terminals via which the electric power is extracted.

Each fuel cell is composed of an anode electrode (fuel electrode), a cathode electrode (oxidant electrode), and an electrolyte membrane interposed between the anode electrode and the cathode electrode. In each fuel cell, anode gas (fuel gas) containing hydrogen at the anode electrode, and cathode gas (oxidant gas) containing oxygen at the cathode electrode, bring about an electrochemical reaction at the electrolyte membrane. The following electrochemical reactions proceed in the anode electrode and the cathode electrode.

(1) Anode electrode: $2H_2 \rightarrow 4H^+ + 4e^-$
(2) Cathode electrode: $4H^+ + 4e^- + O_2 \rightarrow 2H_2O$ In each fuel cell, the foregoing electrochemical reactions (1) and (2) generate an electromotive force and water. The fuel cells stacked in the fuel cell stack 1 are connected in series. Thus, the sum of cell voltages generated in the fuel cells is the output voltage of the fuel cell stack 1 (e.g., several hundred volts).

The cathode gas supply/discharge apparatus 2 and the anode gas supply/discharge apparatus 3 supply cathode gas and anode gas, respectively, to the fuel cell stack 1.

The cathode gas supply/discharge apparatus 2 supplies cathode gas to the fuel cell stack 1, and discharges cathode off-gas discharged from the fuel cell stack 1 to the outer air. The cathode gas supply/ discharge apparatus 2 includes a cathode gas supply passage 21, a filter 22, a cathode compressor 23, a cathode pressure sensor 24, a cathode gas discharge passage 25, and a cathode pressure regulator valve 26.

Cathode gas to be supplied to the fuel cell stack 1 flows in the cathode gas supply passage 21. The cathode gas supply passage 21 is connected to the filter 22 at one end, and to a cathode gas inlet hole of the fuel cell stack 1 at the other end.

The filter 22 removes foreign substances in cathode gas to be introduced into the cathode gas supply passage 21.

The cathode compressor 23 is provided in the cathode gas supply passage 21. The cathode compressor 23 introduces the air (outer air) as cathode gas into the cathode gas supply passage 21 via the filter 22, and supplies that air to the fuel cell stack 1.

The cathode pressure sensor 24 is provided in the cathode gas supply passage 21 so as to be located downstream relative to the cathode compressor 23. The cathode pressure sensor 24 detects the pressure of cathode gas to be supplied to the fuel cell stack 1. The pressure detected by the cathode pressure sensor 24 is output to the controller 6.

Cathode off-gas that has been discharged from the fuel cell stack 1 flows in the cathode gas discharge passage 25. The cathode gas discharge passage 25 is connected to a cathode gas outlet hole of the fuel cell stack 1 at one end, and is open at the other end.

The cathode pressure regulator valve 26 is provided in the cathode gas discharge passage 25. The cathode pressure regulator valve 26 is controlled to open/close by the controller 6, and adjusts the pressure of cathode gas supplied from the cathode compressor 23 to the fuel cell stack 1 to a desired pressure.

Although not shown in FIG. 1, a humidifier apparatus may be provided in the cathode gas supply passage 21 to humidify the fuel cell stack 1.

The anode gas supply/discharge apparatus 3, which is a dead-end system, supplies anode gas to the fuel cell stack 1 and discharges, to the cathode gas discharge passage 25, anode off-gas that has been discharged from the fuel cell stack 1. The anode gas supply/discharge apparatus 3 includes a high-pressure tank 31, an anode gas supply passage 32, an anode pressure regulator valve 33, an anode pressure sensor 34, an anode gas discharge passage 35, a buffer tank 36, and a purge valve 37.

The high-pressure tank 31 reserves anode gas to be supplied to the fuel cell stack 1 while maintaining the same in a high-pressure state.

Anode gas is supplied from the high-pressure tank 31 to the fuel cell stack 1 via the anode gas supply passage 32. The anode gas supply passage 32 is connected to the high-pressure tank 31 at one end, and to an anode gas inlet hole of the fuel cell stack 1 at the other end.

The anode pressure regulator valve 33 is provided in the anode gas supply passage 32. The anode pressure regulator valve 33 is controlled to open/close by the controller 6, and adjusts the pressure of anode gas that has flowed from the high-pressure tank 31 to the anode gas supply passage 32 to a desired pressure.

The anode pressure sensor 34 is provided in the anode gas supply passage 32 so as to be located downstream relative to the anode pressure regulator valve 33. The anode pressure sensor 34 detects the pressure of anode gas to be supplied to the fuel cell stack 1. The pressure detected by the anode pressure sensor 34 is output to the controller 6.

Anode off-gas that has been discharged from the fuel cell stack 1 flows in the anode gas discharge passage 35. The anode gas discharge passage 35 is connected to an anode gas outlet hole of the fuel cell stack 1 at one end, and to the cathode gas discharge passage 25 at the other end.

The buffer tank 36 is provided in the anode gas discharge passage 35. The buffer tank 36 is a container that reserves anode off-gas that has been discharged from the fuel cell stack 1. The buffer tank 36 allows impurity gases to be discharged to a region that is downstream relative to electric power generation regions in the fuel cell stack 1. This can suppress an increase in the concentration of impurity gases in the electric power generation regions in the fuel cell stack 1.

Note that an electric power generation region in the fuel cell stack 1 denotes a region where the electrolyte membrane is interposed between an anode gas flow passage and a cathode gas flow passage in each fuel cell. In place of the buffer tank 36, a container may be provided in a portion where the anode gas flow passages in the fuel cells merge inside the fuel cell stack 1 so as to accumulate anode off-gas therein.

The purge valve 37 is provided in the anode gas discharge passage 35. The purge valve 37 is controlled to open/close by the controller 6, and controls the flow rate of anode off-gas discharged from the anode gas discharge passage 35 to the cathode gas discharge passage 25.

The stack cooling apparatus 4 cools the fuel cell stack 1, and maintains the fuel cell stack 1 at a temperature appropriate for the electric power generation. The stack cooling apparatus 4 includes a cooling water circulation passage 41, a radiator 42, a bypass passage 43, a three-way valve 44, a circulation pump 45, a PTC heater 46, a first water temperature sensor 47, and a second water temperature sensor 48.

Cooling water for cooling the fuel cell stack 1 circulates in the cooling water circulation passage 41.

The radiator 42 is provided in the cooling water circulation passage 41, and cools the cooling water that has been discharged from the fuel cell stack 1.

The bypass passage 43 allows cooling water to bypass the radiator 42 so as to circulate the same to the fuel cell stack 1. The bypass passage 43 is connected to the cooling water circulation passage 41 at one end, and to the three-way valve 44 at the other end.

The three-way valve 44 is provided in the cooling water circulation passage 41 so as to be located downstream relative to the radiator 42. The three-way valve 44 switches between circulation paths of cooling water in accordance with the temperature of cooling water.

The circulation pump 45 is provided in the cooling water circulation passage 41 so as to be located downstream relative to the three-way valve 44, and circulates cooling water.

The PTC heater 46 is provided in the bypass passage 43. Electric power is applied to the PTC heater 46 at the time of warm-up of the fuel cell stack 1 so as to increase the temperature of cooling water.

The first water temperature sensor 47 is provided in the cooling water circulation passage 41 so as to be located upstream relative to the radiator 42. The first water temperature sensor 47 detects the temperature of cooling water that has been discharged from the fuel cell stack 1 (hereinafter referred to as "stack outlet water temperature").

The second water temperature sensor 48 is provided in the cooling water circulation passage 41 so as to be located between the circulation pump 45 and the fuel cell stack 1. The second water temperature sensor 48 detects the temperature of cooling water to be supplied to the fuel cell stack 1.

The electric power system 5 includes a current sensor 51, a voltage sensor 52, the driving motor 53, an inverter 54, a battery 55, a DC/DC converter 56, and auxiliary machines 57.

The current sensor 51 detects the current extracted from the fuel cell stack 1 (hereinafter referred to as "output current"). The output current detected by the current sensor 51 is output to the controller 6.

The voltage sensor 52 detects a potential difference between the potential of the anode electrode output terminal 11 and the potential of the cathode electrode output terminal 12 (hereinafter referred to as "output voltage"). The output voltage detected by the voltage sensor 52 is output to the controller 6.

The driving motor 53 is a three-phase alternating-current synchronous motor including a rotor with an embedded permanent magnet, and a stator around which stator coils are wound. The driving motor 53 has functions of an electric motor that is rotated and driven by receiving the electric power supplied from the fuel cell stack 1 and the battery 55, as well as functions of an electric generator that generates an electromotive force at both ends of the stator coils by rotating the rotor using an external force when a vehicle decelerates.

The inverter 54 is composed of, for example, a plurality of semiconductor switches, such as insulated-gate bipolar transistors (IGBTs). The semiconductor switches of the inverter 54 are controlled to turn on/off by the controller 6. Consequently, direct-current electric power is converted into alternating-current electric power, or vice versa.

In order to cause the driving motor 53 to function as the electric motor, the inverter 54 converts the direct-current electric power generated by combining the electric power generated by the fuel cell stack 1 and the output electric power of the battery 55 into three-phase alternating-current electric power, and supplies the three-phase alternating-current electric power to the driving motor 53. On the other hand, in order to cause the driving motor 53 to function as the electric generator, the inverter 54 converts the regenerative electric power (three-phase alternating-current electric power) of the driving motor 53 into direct-current electric power, and supplies the direct-current electric power to the battery 55.

The battery 55 is charged with the regenerative electric power of the driving motor 53 or the electric power generated by the fuel cell stack 1. The electric power with which the battery 55 has been charged is supplied to the auxiliary machines 57 and the driving motor 53 as needed.

The DC/DC converter 56 is a bidirectional voltage converter that increases/reduces the output voltage of the fuel cell stack 1. One voltage terminal of the DC/DC converter 56 is connected to the fuel cell stack 1, whereas the other voltage terminal of the DC/DC converter 56 is connected to the battery 55.

The DC/DC converter 56 increases or reduces the voltage generated at its voltage terminal connected to the fuel cell stack 1 using the electric power of the battery 55. The DC/DC converter 56 adjusts the output voltage of the fuel cell stack 1, and controls the output current of the fuel cell stack 1 and the electric power generated by the fuel cell stack 1 (output current x output voltage).

The auxiliary machines 57 are connected in parallel between the DC/DC converter 56 and the battery 55. The auxiliary machines 57 include the cathode compressor 23, the circulation pump 45, the PTC heater 46, and the like, and are driven by receiving the electric power supplied from the battery 55 or the fuel cell stack 1.

The controller 6 is composed of a microcomputer provided with a central processing unit (CPU), a read-only memory (ROM), a random-access memory (RAM), and an input/output (I/O) interface.

The controller 6 receives, as input, signals from the aforementioned first water temperature sensor 47, second water temperature sensor 48, current sensor 51, and voltage sensor 52. The controller 6 also receives, as input, signals from various types of sensors that are necessary for controlling the fuel cell system 100.

Other sensors include a key sensor 61 and an acceleration stroke sensor 62. The key sensor 61 detects a start request and a stop request for the fuel cell system 100 on the basis of on/off of a start key. The acceleration stroke sensor 62 detects a depression amount of an accelerator pedal.

Upon receiving a start request from the key sensor 61, the controller 6 determines that the fuel cell system 100 has been activated, and performs warm-up control to warm up the fuel cell stack 1 to a temperature appropriate for the electric power generation (hereinafter referred to as "warm-up facilitation operation").

In the warm-up facilitation operation, the controller 6 supplies electric power from the fuel cell stack 1 to the auxiliary machines 57 by controlling the DC-to-CD converter 56, thereby causing the fuel cell stack 1 to generate electric power necessary for driving the auxiliary machines 57. As the fuel cell stack 1 generates heat by itself through the electric power generation, the fuel cell stack 1 warms up by itself.

Furthermore, during the warm-up facilitation operation, the controller 6 sets the rotation speed of the circulation pump 45 to an upper limit value of a variable range, and sets the output of the PTC heater 46, that is to say, the amount of heat generation by the PTC heater 46 to an upper limit value of a variable range.

Consequently, the fuel cell stack 1 is warmed up also by cooling water that has been heated by the PTC heater 46. In addition, as the electric power consumed by the circulation pump 45 and the PTC heater 46 increases, the electric power generated by the fuel cell stack 1 increases, and the amount of self-heat generation by the fuel cell stack 1 increases as well. Thus, warm-up of the fuel cell stack 1 is further facilitated.

By performing the foregoing warm-up facilitation operation, a warm-up period from the activation of the fuel cell system 100 to the completion of warm-up of the fuel cell stack 1 can be shortened.

Furthermore, when the fuel cell stack 1 is activated, the controller 6 executes computation processing to estimate the current-voltage (I-V) characteristic of the fuel cell stack 1 (hereinafter referred to as "I-V estimation"). Now, the I-V estimation will be briefly described with reference to FIG. 2.

Figure 2:
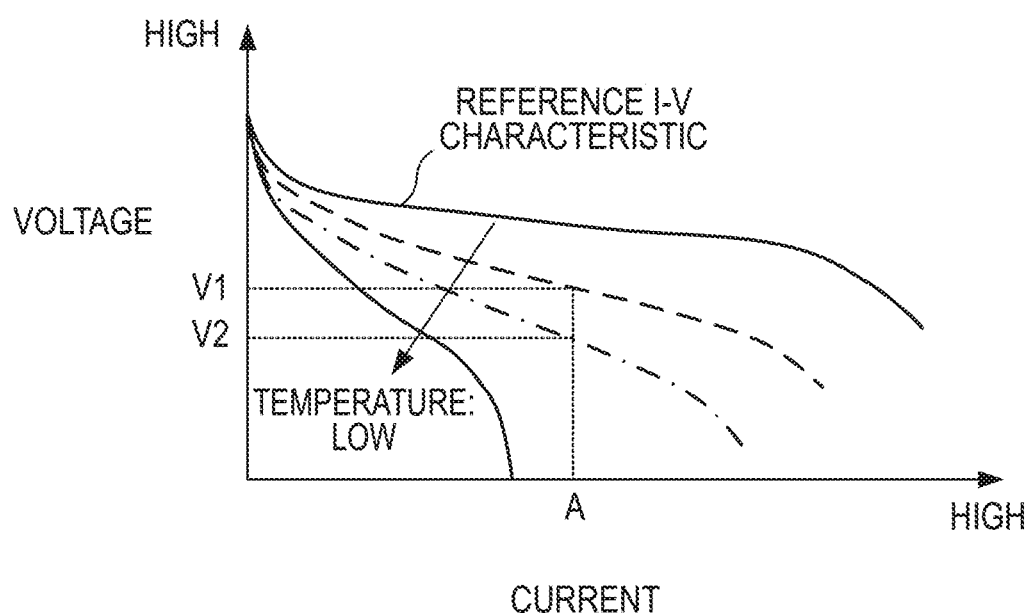
FIG. 2 is an explanatory diagram showing a method of estimating the I-V characteristic of fuel cells.

FIG. 2 shows a relationship between the I-V characteristic of the fuel cell stack 1 and the temperature of the fuel cell stack 1.

As shown in FIG. 2, with a reduction in the temperature of the fuel cell stack 1, the I-V characteristic of the fuel cell stack 1 falls below a reference I-V characteristic, and the electric power generated by the fuel cell stack 1 (voltage x current) decreases. The reference I-V characteristic is prescribed on the basis of, for example, the I-V characteristic during normal operation.

In the case of the I-V characteristic indicated by a dash line in FIG. 2, current A is the output current with which the fuel cell stack 1 generates the minimum driving electric power, and voltage V1 is the output voltage with which the output current A is extracted. The minimum driving electric power is a lower limit value of electric power that allows the driving motor 53 to drive the vehicle.

In this case, as the minimum driving electric power can be supplied from the fuel cell stack 1 to the driving motor 53, the controller 6 permits the vehicle to run so as to enable a supply of electric power from the fuel cell stack 1 to the driving motor 53.

On the other hand, in the case of the I-V characteristic indicated by a dash-and-dot line in FIG. 2, voltage V2 is the output voltage with which the output current A is extracted from the fuel cell stack 1. In the case of this I-V characteristic, if the output voltage of the fuel cell stack 1 is set to a voltage value within a range that allows both of the driving motor 53 and the inverter 54 to operate, then the output current extracted from the fuel cell stack 1 decreases, and hence the electric power generated by the fuel cell stack 1 falls below the minimum driving electric power.

In this case, as the minimum driving electric power cannot be supplied from the fuel cell stack 1 to the driving motor 53, the controller 6 prohibits a supply of electric power from the fuel cell stack 1 to the driving motor 53.

In order to quickly permit the vehicle to run, it is necessary to accurately determine that the fuel cell stack 1 generates electric power equal to or higher than the minimum driving electric power when the output voltage of the fuel cell stack 1 is set to a voltage value that allows the driving motor 53 and the inverter 54 to operate.

Next, a method of estimating the I-V characteristic of the fuel cell stack 1 will be briefly described.

It is known that the relationship between the output current I and a difference $\Delta V$ obtained by subtracting the actual output voltage (detected value) from a reference voltage specified by the reference I-V characteristic can be approximated using a linear function indicated by expression (1) on the condition that the influence of concentration overpotential is small.

$$\Delta V = aI + b \quad (1)$$

The controller 6 performs current control to vary the output current of the fuel cell stack 1 with a predetermined amplitude, and measures the output current and the output voltage (electric power generation voltage) multiple times using the current sensor 51 and the voltage sensor 52 while varying the output current. The controller 6 calculates "a" and "b" in expression (1) from the measured output currents and output voltages.

Once calculated, "a" and "b" in expression (1) yield the output voltage corresponding to the output current A with which the minimum driving electric power is supplied from the fuel cell stack 1 to the driving motor 53. If the yielded output voltage is equal to or higher than the voltage V1, then the fuel cell stack 1 can supply the minimum driving electric power to the driving motor 53.

The controller 6 repeatedly performs the I-V estimation at a predetermined interval (e.g., at a five-second interval) from when the I-V estimation is started until when the fuel cell stack 1 can supply the minimum driving electric power to the driving motor 53.

A description is now given of a functional configuration of the controller 6.

Figure 3:
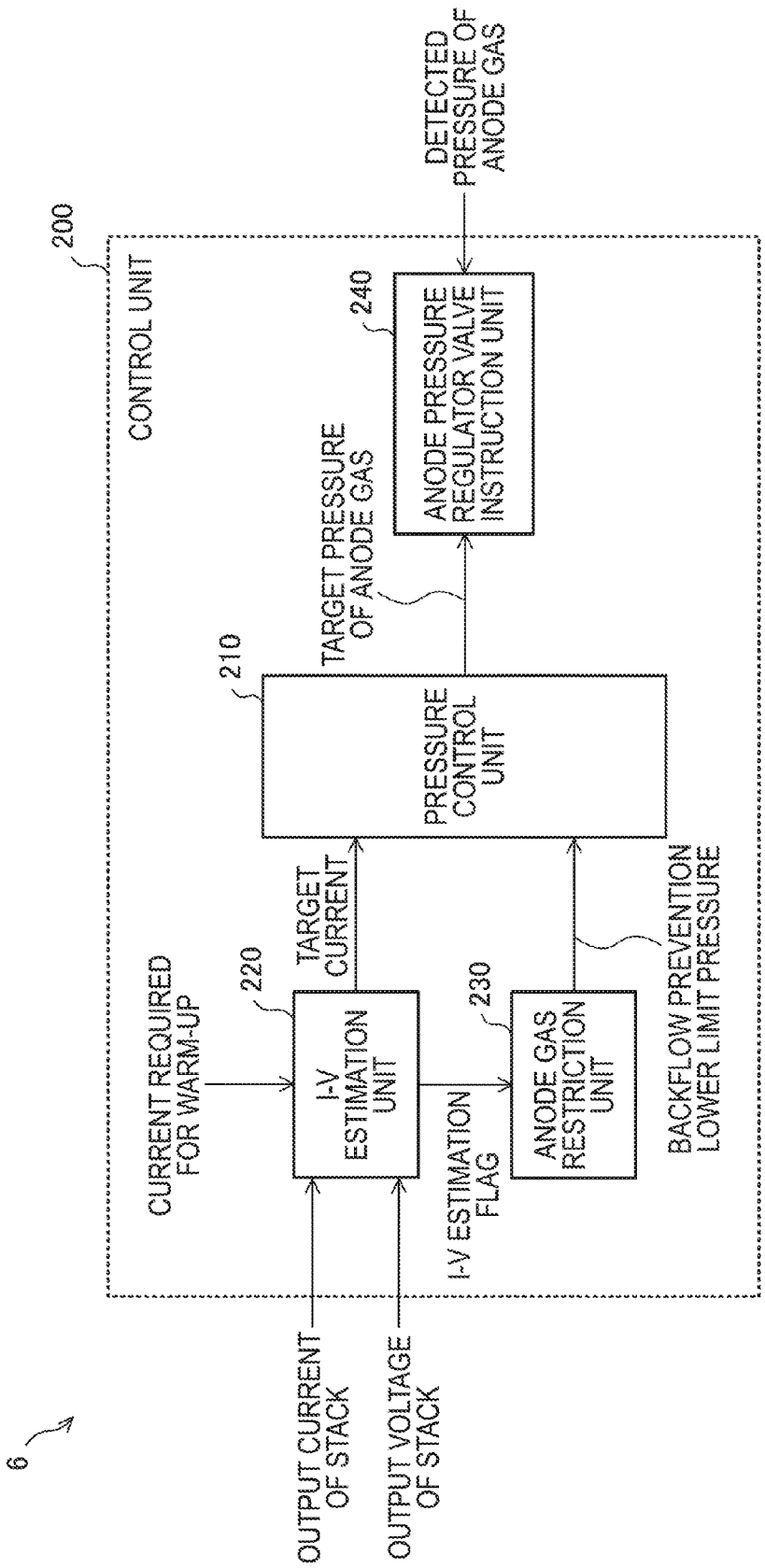
FIG. 3 is a block diagram showing a control unit composing a controller.

FIG. 3 is a functional block diagram showing an example of a control unit 200 composing the controller 6.

The control unit 200 causes the fuel cell stack 1 to generate electric power on the basis of input signals from various types of sensors provided in the fuel cell system 100 and instruction values for control devices and the like.

The control unit 200 controls the cathode compressor 23, the cathode pressure regulator valve 26, the anode pressure regulator valve 33, and the purge valve 37 to supply anode gas and cathode gas to the fuel cell stack 1 at a flow rate appropriate for the electric power generation. After the vehicle has been permitted to run, the control unit 200 controls the DC/DC converter 56 to supply the electric power generated by the fuel cell stack 1 to the inverter 54 and the auxiliary machines 57.

The control unit 200 also performs the warm-up facilitation operation. Specifically, when the fuel cell system 100 is activated, the control unit 200 determines whether the temperature of the fuel cell stack 1 is lower than a predetermined warm-up threshold (e.g., 50° C.). For example, a stack inlet water temperature or an average of the stack inlet water temperature and the stack outlet water temperature is used as the temperature of the fuel cell stack 1.

If it is determined that the temperature of the fuel cell stack 1 is lower than the warm-up threshold, the control unit 200 starts the warm-up facilitation operation to increase the electric powers consumed by the auxiliary machines 57 and extract a predetermined current necessary for warm-up (hereinafter referred to as "current required for warm-up") from the fuel cell stack 1. For example, the control unit 200 sets each of the electric powers consumed by the cathode compressor 23, the circulation pump 45, and the PTC heater 46 included among the auxiliary machines 57 to an upper limit value of a variable range.

When the temperature of the fuel cell stack 1 has increased to the warm-up threshold through the warm-up facilitation operation, the control unit 200 determines that warm-up of the fuel cell stack 1 has been completed, and ends the warm-up facilitation operation.

On the other hand, if it is determined that the temperature of the fuel cell stack 1 is higher than the warm-up threshold, normal operation is performed to control the pressures of anode gas and cathode gas in accordance with the electric power required by the driving motor 53.

On the basis of the electric power required by the auxiliary machines 57 and the driving motor 53, the control unit 200 calculates a target value of the current extracted from the fuel cell stack 1 (hereinafter referred to as "target current"). The larger the depression amount detected by the acceleration stroke sensor 62, the higher the target current.

Once the control unit 200 has calculated the target current, the control unit 200 calculates a target value of the pressure of anode gas to be supplied to the fuel cell stack 1 (target pressure) on the basis of the target current. Specifically, the higher the target current, the higher the target pressure of anode gas set by the control unit 200. The control unit 200 also calculates target values of the pressure and flow rate of cathode gas to be supplied to the fuel cell stack 1 on the basis of the target current.

Once the control unit 200 has calculated the target current, the control unit 200 refers to the I-V characteristic of the fuel cell stack 1 to calculate a voltage value corresponding to the target current as a target voltage. Then, the control unit 200 adjusts the voltage terminal of the DC/DC converter 56 connected to the fuel cell stack 1 to the target voltage. Consequently, the fuel cell stack 1 outputs current equivalent to the target current.

The control unit 200 includes a pressure control unit 210, an I-V estimation unit 220, and an anode gas restriction unit 230.

The pressure control unit 210 controls the cathode compressor 23 and the cathode pressure regulator valve 26 to make the pressure of cathode gas to be supplied higher when the target current of the fuel cell stack 1 is high than when the target current of the fuel cell stack 1 is low.

Similarly, the pressure control unit 210 increases the duty cycle of the anode pressure regulator valve 33 to make the pressure of anode gas to be supplied to the fuel cell stack 1 higher when the target current of the fuel cell stack 1 is high than when the target current of the fuel cell stack 1 is low.

For example, the pressure control unit 210 stores a pressure map indicating correspondence between power generation currents and anode gas pressures. Upon obtaining the target current, the pressure control unit 210 calculates an anode gas pressure corresponding to the target current as the target pressure. The anode pressure regulator valve 33 adjusts the pressure of anode gas to be supplied to the fuel cell stack 1 to the target pressure.

As such, the pressure of supplied anode gas is increased in accordance with the output current of the fuel cell stack 1. Therefore, when the output current is low, the pressure of supplied anode gas decreases. Accordingly, an interelectrode pressure difference between the anode gas pressure and the cathode gas pressure inside the fuel cell stack 1 can be suppressed. As a result, a stress applied to the electrolyte membranes inside the fuel cell stack 1 can be suppressed.

In order to estimate the I-V characteristic of the fuel cell stack 1, the I-V estimation unit 220 performs current control to vary the output current of the fuel cell stack 1 so as to have an amplitude. In the current control, the I-V estimation unit 220 first increases the target current from the current required for warm-up to an upper limit value for the I-V estimation, and then reduces the target current to the current required for warm-up.

When the output current of the fuel cell stack 1 has been varied, the I-V estimation unit 220 obtains a current value and a voltage value from the current sensor 51 and the voltage sensor 52 sequentially. The I-V estimation unit 220 computes a straight approximation line that enables estimation of the I-V characteristic of the fuel cell stack 1 on the basis of expression (1) by using, among these current values and voltage values, the current values and voltage values obtained while reducing the output current of the fuel cell stack 1.

In the foregoing manner, the I-V estimation unit 220 successively estimates the I-V characteristic of the fuel cell stack 1. The I-V estimation is repeated until the I-V characteristic is restored to the state where the minimum driving electric power can be supplied from the fuel cell stack 1 to the driving motor 53.

In the aforementioned fuel cell system 100, when the I-V estimation unit 220 reduces the target current of the fuel cell stack 1 after increasing the same, the pressure control unit 210 reduces the target pressure of anode gas. As a result, the pressure of anode gas to be supplied to the fuel cell stack 1 decreases. Thus, impurities accumulated in the buffer tank 36 flow back to the fuel cell stack 1, the concentration of impurities in the electric power generation regions in the fuel cell stack 1 increases, and the efficiency of electric power generation by the fuel cell stack 1 declines.

Figure 4:
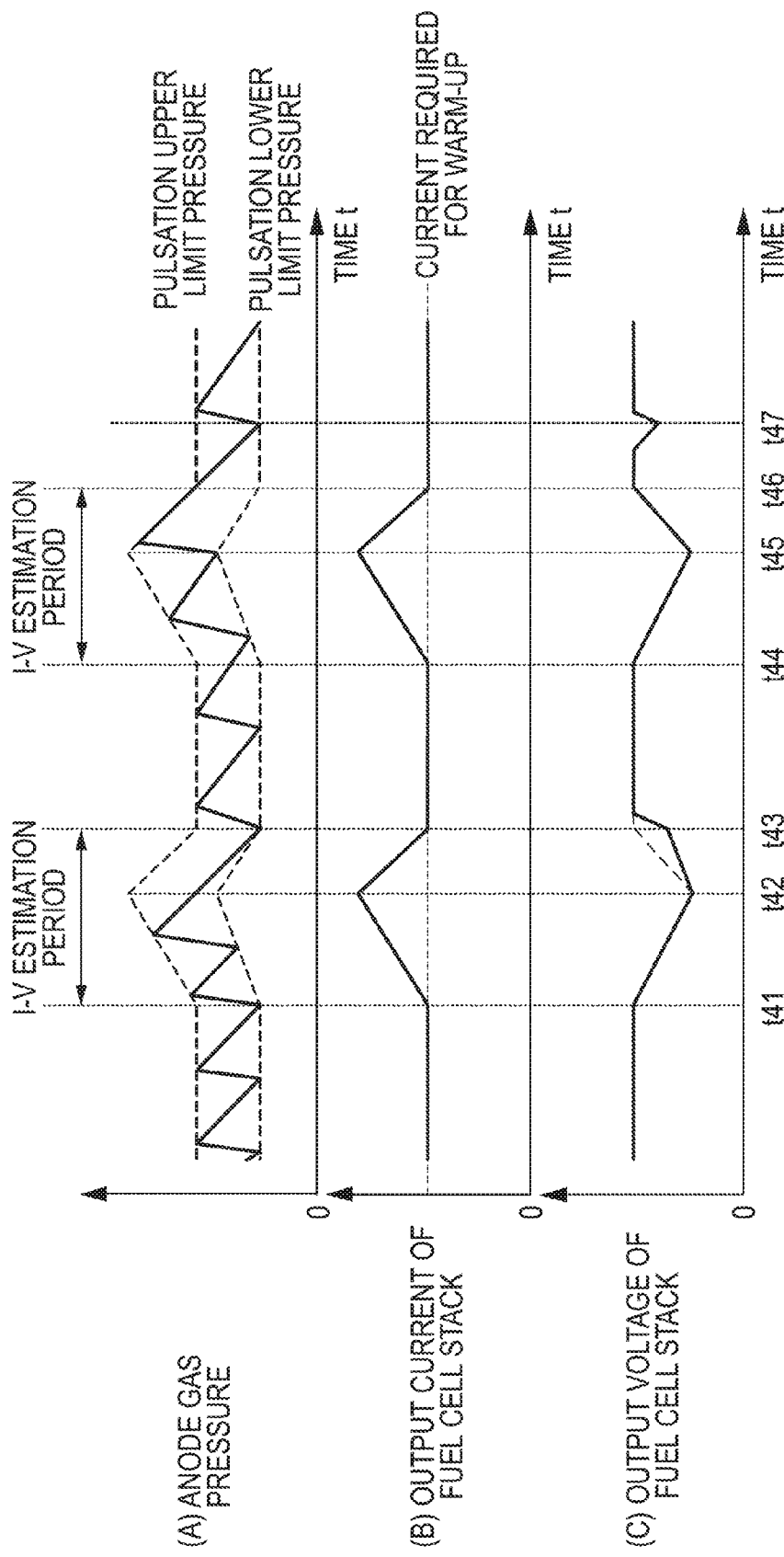
FIG. 4 is an explanatory diagram showing a reduction in the output voltage associated with a reduction in the anode gas pressure at the time of I-V estimation.

FIG. 4 is an explanatory diagram showing a reduction in the output voltage of the fuel cell stack 1 associated with ordinary I-V estimation. In FIG. 4, in order to eject generated water and nitrogen gas that are retained in a downstream side of the anode gas flow passages formed inside the fuel cell stack 1 to the buffer tank 36, the controller 6 performs a pulsation operation of causing the anode gas pressure to pulsate by controlling the opening degree of the anode pressure regulator valve 33.

FIG. 4(A) shows fluctuations in the pressure of anode gas to be supplied to the fuel cell stack 1. In FIG. 4(A), the pulsated pressure of anode gas during the I-V estimation is indicated by a solid line, and a pulsation upper limit pressure and a pulsation lower limit pressure of anode gas are indicated by dash lines.

FIG. 4(B) shows the output current extracted from the fuel cell stack 1. FIG. 4(C) shows the output voltage of the fuel cell stack 1. Horizontal axes in FIGS. 4(A) to 4(C) represent a common time axis.

Immediately before time t41, the warm-up facilitation operation is performed, and current is supplied from the fuel cell stack 1 only to the auxiliary machines 57 under voltage control by the DC/DC converter 56. Furthermore, due to the pulsation operation on anode gas, impurities retained in the fuel cell stack 1 are ejected to and accumulated in the buffer tank 36.

In an I-V estimation period from time t41 to time t43, the I-V estimation unit 220 performs current control.

Specifically, at time t41, as shown in FIG. 4(B), the output current of the fuel cell stack 1 increases from the current required for warm-up under current control by the I-V estimation unit 220. The output current corresponding to the increase is supplied from the fuel cell stack 1 to the battery 55 via the DC/DC converter 56. Note that the current required for warm-up is a current value extracted from the fuel cell stack 1 during the warm-up facilitation operation.

With the increase in the output current of the fuel cell stack 1, the pulsation lower limit pressure and the pulsation upper limit pressure both increase while the pulsation amplitude defined by the pulsation lower limit pressure and the pulsation upper limit pressure is maintained constant by the pressure control unit 210, as shown in FIG. 4(A).

In order to increase the output current of the fuel cell stack 1, the output voltage of the fuel cell stack 1 is reduced by applying voltage control to the DC/DC converter 56 in accordance with the I-V characteristic of the fuel cell stack 1, as shown in FIG. 4(C).

At time t42, the output current of the fuel cell stack 1 reaches an upper limit value set by the I-V estimation unit 220. Subsequently, the output current is reduced to the current required for warm-up under current control by the I-V estimation unit 220, as shown in FIG. 4(B). Note that the upper limit value of the output current is set beforehand on the basis of, for example, the amount of current that can be supplied to the battery 55.

While reducing the output current of the fuel cell stack 1, the I-V estimation unit 220 sequentially obtains, from the current sensor 51 and the voltage sensor 52, the output current and the output voltage of the fuel cell stack 1 that are detected at a predetermined sampling interval.

With the reduction in the output current of the fuel cell stack 1, the pulsation lower limit pressure and the pulsation upper limit pressure are both reduced by the pressure control unit 210, as shown in FIG. 4(A).

Therefore, in a current reduction period from time t42 to time t43, the pulsation lower limit pressure decreases while reducing the pulsated pressure of anode gas. At this time, the opening degree of the anode pressure regulator valve 33 is controlled so that the amount of anode gas consumed by the fuel cell stack 1 exceeds the flow rate of supplied anode gas. As a result, a reduction in the pulsated pressure of anode gas exceeds a predetermined pulsation amplitude.

When the amplitude corresponding to a reduction in the pulsated pressure of anode gas increases, the anode gas pressure inside the fuel cell stack 1 temporarily falls below the internal pressure the buffer tank 36. This causes impurities accumulated in the buffer tank 36 to flow back to the fuel cell stack 1. Consequently, the concentration of impurities inside the fuel cell stack 1 increases, and the efficiency of electric power generation by the fuel cell stack 1 declines temporarily.

Thus, as shown in FIG. 4(C), the output voltage of the fuel cell stack 1 falls below an intended voltage value indicated by a dash line. It is under such a circumstance that the I-V characteristic of the fuel cell stack 1 is estimated on the basis of the output voltage detected by the voltage sensor 52 and the output current detected by the current sensor 51. This lowers the precision of estimation of the I-V characteristic of the fuel cell stack 1.

Note that in a current reduction period from time t45 to time t46, the amplitude corresponding to a reduction in the pulsated pressure of anode gas does not exceed the predetermined pulsation amplitude as shown in FIG. 4(A), and thus there is no backflow of impurities from the buffer tank 36. Accordingly, as shown in FIG. 4(C), the output voltage of the fuel cell stack 1 does not undergo a voltage reduction associated with a backflow of impurities, and matches an intended voltage value. However, at time t47, the output voltage of the fuel cell stack 1 temporarily decreases as shown in FIG. 4(C) because the amplitude corresponding to a reduction in the pulsated pressure exceeds the predetermined pulsation amplitude as shown in FIG. 4(A).

As such, in the ordinary fuel cell system 100, the anode gas pressure undergoes a reduction associated with control for reducing the target current in the I-V estimation period. This causes a backflow of impurities from the buffer tank 36 to the fuel cell stack 1. As a result, the concentration of impurities inside the electric power generation region in each battery cell increases. Accordingly, the overall efficiency of electric power generation by the fuel cell stack 1 declines, and the output voltage of the fuel cell stack 1 falls below an intended voltage value. This lowers the precision of estimation of the I-V characteristic of the fuel cell stack 1.

To address the foregoing issue, in the present embodiment, the anode gas restriction unit 230 is provided in the control unit 200 shown in FIG. 3.

The anode gas restriction unit 230 is a restriction unit that, on the basis of a set value of an I-V estimation flag, sets the target pressure of anode gas to a predetermined lower limit value for preventing a backflow of impurities from the buffer tank 36 to the fuel cell stack 1 (hereinafter referred to as "backflow prevention lower limit value"). The backflow prevention lower limit value is set beforehand on the basis of, for example, data of experiments and the like. Alternatively, the backflow prevention lower limit pressure may be set on the basis of the speed of a reduction in the anode gas pressure and the amplitude corresponding to a reduction in the anode gas pressure.

The I-V estimation flag is used to specify a period in which the I-V estimation is performed. The I-V estimation flag is set by the I-V estimation unit 220. For example, the I-V estimation unit 220 sets the I-V estimation flag to "1" at the start of the I-V estimation period shown in FIGS. 4(A) to 4(C), and sets the I-V estimation flag to "0" at the end of the I-V estimation period. Alternatively, the I-V estimation unit 220 may set the I-V estimation flag to "1" only in the current reduction period in which the output current of the fuel cell stack 1 is reduced.

When the I-V estimation flag indicates "1," the anode gas restriction unit 230 sets the target pressure of anode gas to the aforementioned backflow prevention lower limit value. The larger the upper limit value of the target current in the I-V estimation period, the larger the backflow prevention lower limit value set by the anode gas restriction unit 230.

On the other hand, when the I-V estimation flag indicates "0," the anode gas restriction unit 230 obtains the target pressure of anode gas from the pressure control unit 210, and outputs the obtained target pressure to an anode pressure regulator valve instruction unit 240 without restricting the obtained target pressure to the backflow prevention lower limit value.

The anode pressure regulator valve instruction unit 240 sequentially obtains the anode gas pressure detected by the anode pressure sensor 34, and applies feedback control to the anode pressure regulator valve 33 so that a pressure difference obtained by subtracting the detected pressure from the target pressure of anode gas matches zero.

Specifically, when the pressure difference exceeds zero, the anode pressure regulator valve instruction unit 240 increases the opening degree of the anode pressure regulator valve 33 so that the pressure of supplied anode gas increases. On the other hand, when the pressure difference falls below zero, the anode pressure regulator valve instruction unit 240 reduces the opening degree of the anode pressure regulator valve 33 so that the pressure of supplied anode gas decreases.

Figure 5:
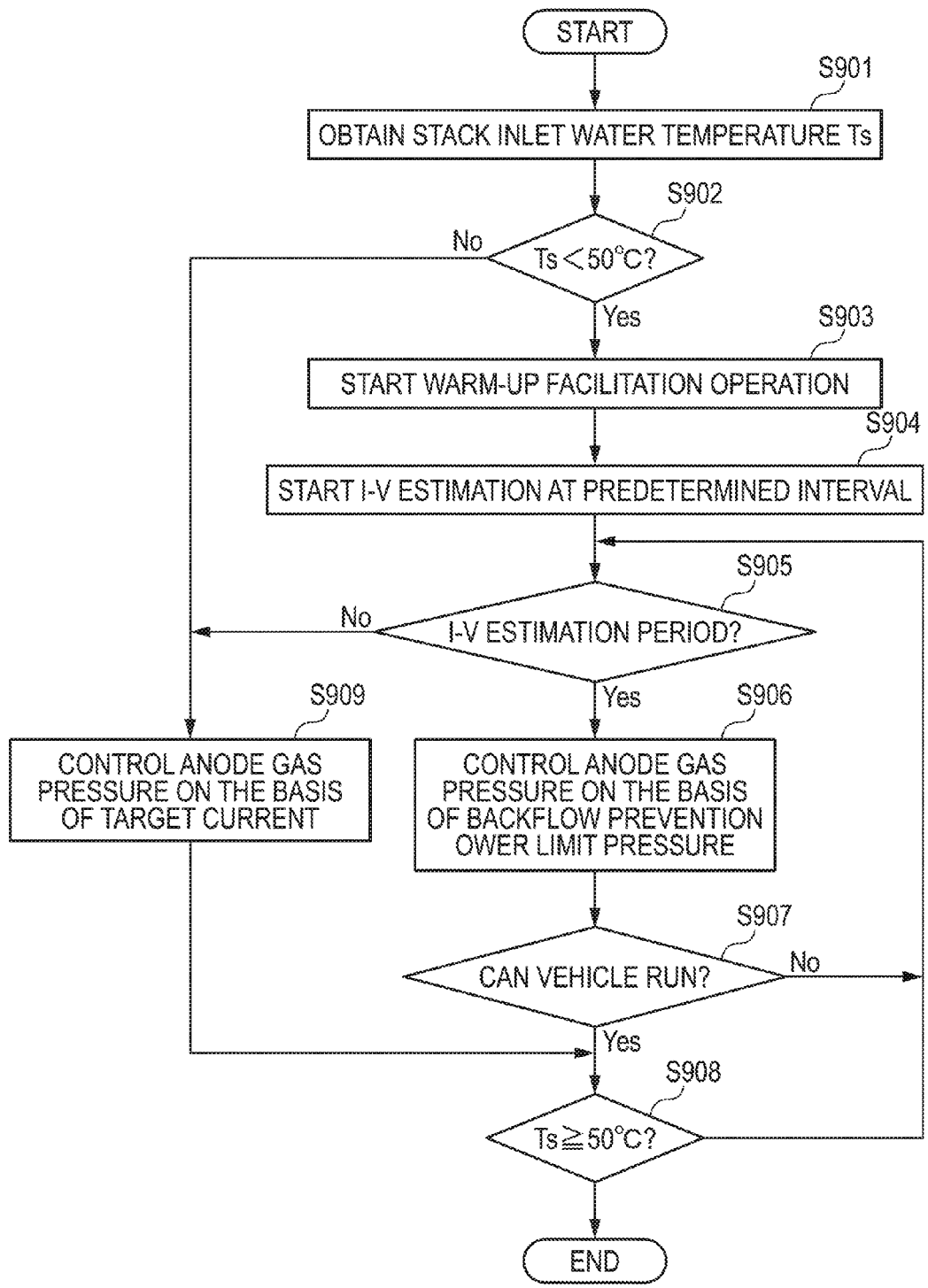
FIG. 5 is a flowchart showing a method of restricting a reduction in the anode gas pressure at the time of I-V estimation.

FIG. 5 is a flowchart showing a method of restricting a reduction in the anode gas pressure associated with the I-V estimation.

First, upon receiving a start request from the key sensor 61, the control unit 200 of the controller 6 activates the fuel cell system 100.

When the fuel cell system 100 has been activated, the control unit 200 obtains a stack inlet water temperature Ts from the second water temperature sensor 48 in step S901.

In step S902, the control unit 200 determines whether the stack inlet water temperature Ts is lower than the warm-up threshold (50° C.). If the stack inlet water temperature Ts is determined to be equal to or higher than 50° C., step S909 follows.

On the other hand, if the stack inlet water temperature Ts is determined to be lower than 50° C., the control unit 200 performs the warm-up facilitation operation in step S903. In the warm-up facilitation operation, the control unit 200 increases electric power supplied to, for example, each of the cathode compressor 23 and the PTC heater 46 included among the auxiliary machines 57 to an upper limit value of a variable range.

Furthermore, in step S904, the I-V estimation unit 220 of the control unit 200 performs current control to vary the output current of the fuel cell stack 1 within a predetermined range at a predetermined interval (e.g., at a five-second interval). At this time, the I-V estimation unit 220 changes the I-V estimation flag from "0" to "1."

Then, in step S905, the anode gas restriction unit 230 of the control unit 200 determines whether the I-V estimation unit 220 is performing current control, that is to say, whether the fuel cell system 100 is in the I-V estimation period. Specifically, the anode gas restriction unit 230 determines whether the I-V estimation flag is set to "1."

If the anode gas restriction unit 230 determines that the fuel cell system 100 is in the I-V estimation period, in step S906, the anode gas restriction unit 230 sets the backflow prevention lower limit pressure described using FIG. 3 in the pressure control unit 210. The pressure control unit 210 sets the backflow prevention lower limit pressure as the target pressure of anode gas, and adjusts the opening degree of the anode pressure regulator valve 33 so that the detected pressure of anode gas to be supplied to the fuel cell stack 1 matches the target pressure.

In this way, a reduction in the anode gas pressure can be restricted while securing the flow rate of anode gas necessary for the electric power generation by the fuel cell stack 1 in the I-V estimation period.

In the I-V estimation period, after the output current of the fuel cell stack 1 is increased, the I-V estimation unit 220 obtains a current value and a voltage value from the current sensor 51 and the voltage sensor 52, sequentially, in the current reduction period in which the output current is reduced. Once the I-V estimation period has ended, the anode gas restriction unit 230 cancels the setting of the backflow prevention lower limit pressure in the pressure control unit 210.

In step S907, the I-V estimation unit 220 obtains a straight approximation line based on expression (1) using the current values and the voltage values obtained in the current reduction period, and determines whether the fuel cell stack 1 can supply the minimum driving electric power to the driving motor 53, as described using FIG. 2, with reference to the straight approximation line. That is to say, the I-V estimation unit 220 estimates the I-V characteristic of the fuel cell stack 1, and determines whether the vehicle can run using the estimated I-V characteristic.

If it is determined that the vehicle cannot run, step S905 follows, in which the I-V estimation is performed at a predetermined interval until it is determined that the vehicle can run. If it is determined in step S905 that the fuel cell system 100 is not in the I-V estimation period, step S909 follows.

In step S909, the anode gas restriction unit 230 cancels the setting of the backflow prevention lower limit pressure in the pressure control unit 210. In this way, the pressure control unit 210 calculates the target pressure of anode gas necessary for the electric power generation by the fuel cell stack 1 on the basis of the target current of the fuel cell stack 1, and adjusts the opening degree of the anode pressure regulator valve 33 so that the detected pressure of anode gas matches the target pressure.

If it is determined in step S907 that the vehicle can run, the control unit 200 determines whether the stack inlet water temperature Ts has reached 50° C. in step S908. The sequence of processes from step S905 to step S909 is repeated until the stack inlet water temperature Ts reaches 50° C. When the stack inlet water temperature Ts has reached 50° C., the warm-up facilitation operation is ended, and the method of restricting a reduction in the anode gas pressure is ended.

In the first embodiment of the present invention, impurities retained in the fuel cell stack 1 are discharged with the use of the buffer tank 36. Thus, the concentration of impurities inside the electric power generation regions of the fuel cell stack 1 is lowered, and a decline in the efficiency of electric power generation by the fuel cell stack 1 can be suppressed.

Furthermore, as the anode gas restriction unit 230 restricts a reduction in the anode gas pressure in the I-V estimation period in which the output current of the fuel cell stack 1 is provided with an amplitude, the amount of backflow of impurities from the buffer tank 36 to the fuel cell stack 1 can be suppressed. This can prevent a decline in the efficiency of electric power generation by the fuel cell stack 1 associated with a backflow of impurities, and suppress a decline in the precision of estimation of the I-V characteristic.

That is to say, a decline in the precision of estimation of the I-V characteristic caused by a backflow of impurities from the buffer tank 36 at the time of I-V estimation can be suppressed while suppressing an increase in the concentration of impurities retained in the electric power generation regions of the fuel cell stack 1 with the use of the buffer tank 36.

(Second Embodiment)

Figure 6:
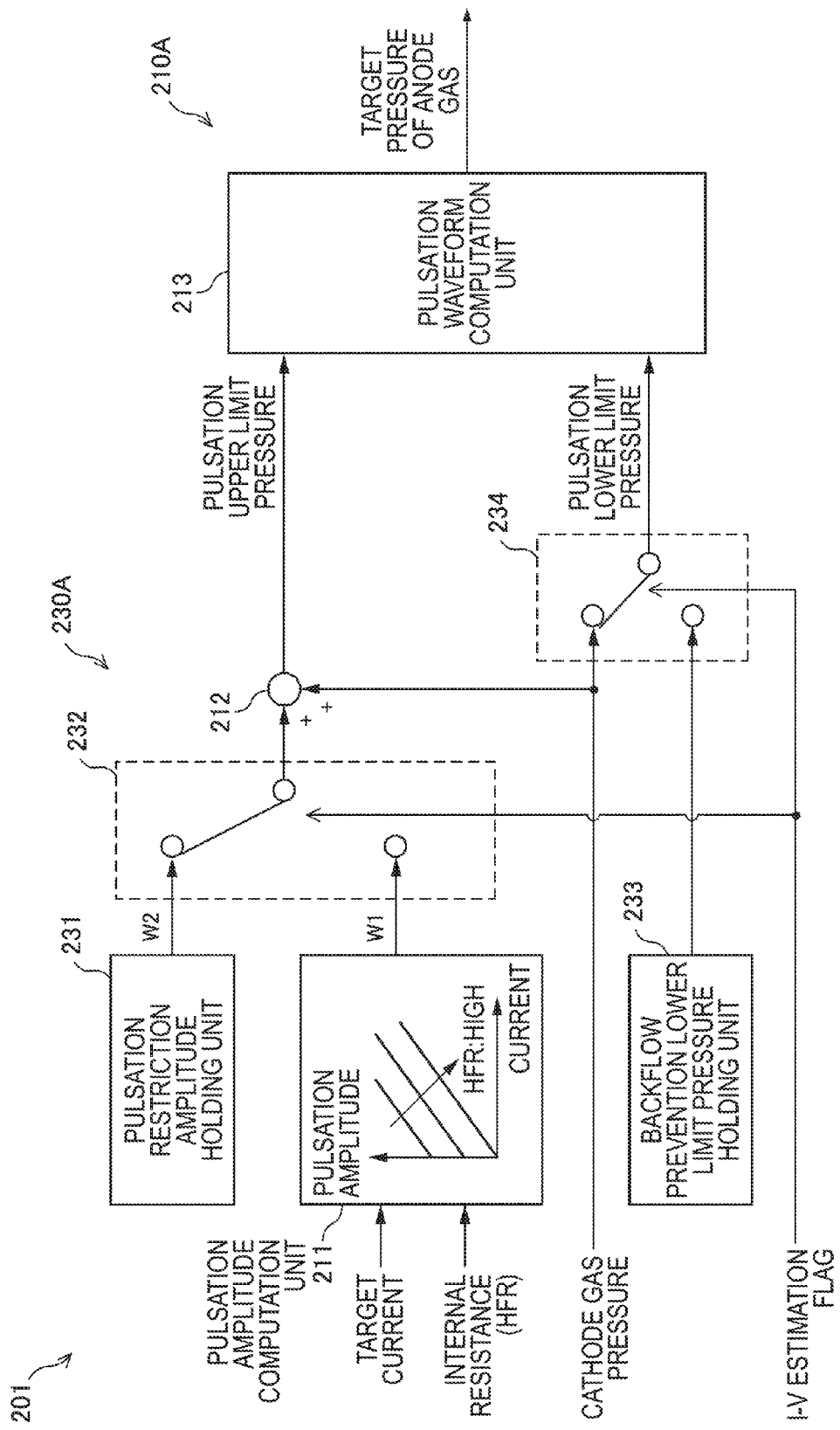
FIG. 6 is a block diagram showing an anode gas control unit according to a second embodiment.

FIG. 6 shows a configuration of an anode gas control unit 201 according to a second embodiment of the present invention. Note that a fuel cell system according to the present embodiment is basically configured in the same manner as the fuel cell system 100 shown in FIGS. 1 and 3. Below, components that are the same as those of the fuel cell system 100 are given the same reference signs thereas, and a detailed description thereof is omitted.

The anode gas control unit 201 has a function of controlling the pressure of anode gas to be supplied to the fuel cell stack 1 among the functions of the control unit 200 shown in FIG. 3.

The anode gas control unit 201 includes a pulsation operation unit 210A and a backflow prevention restriction unit 230A.

The pulsation operation unit 210A includes a pulsation amplitude computation unit 211, a pulsation upper limit pressure calculation unit 212, and a pulsation waveform computation unit 213. The backflow prevention restriction unit 230A includes a pulsation restriction amplitude holding unit 231, a pulsation amplitude switching unit 232, a backflow prevention lower limit pressure holding unit 233, and a pulsation lower limit pressure switching unit 234.

The pulsation operation unit 210A performs a pulsation operation of causing the anode gas pressure to pulsate on the basis of a pulsation amplitude necessary for discharging impurities, such as generated water and nitrogen gas associated with the electric power generation. The pulsation operation unit 210A adjusts the pulsation amplitude in accordance with the wet state of the fuel cell stack 1.

The wet state of the fuel cell stack 1 can be estimated by measuring the internal resistance (high-frequency resistance or HFR) of the fuel cell stack 1. The internal resistance of the fuel cell stack 1 is measured using an internal resistance measurement apparatus, which is not shown. For example, the higher the internal resistance of the fuel cell stack 1, the dryer the estimated state of the electrolyte membranes in the fuel cell stack 1. The lower the internal resistance of the fuel cell stack 1, the wetter the estimated state of the electrolyte membranes.

The internal resistance measurement apparatus is connected not only to the anode electrode output terminal 11 and the cathode electrode output terminal 12, but also to an intermediate terminal provided in the fuel cell stack 1. An intermediate potential between the potential of the anode electrode output terminal 11 and the potential of the cathode electrode output terminal 12 is output from the intermediate terminal.

The internal resistance measurement apparatus supplies a high-frequency (e.g., 1-kHz) alternating current to each of the anode electrode output terminal 11 and the cathode electrode output terminal 12. Then, the internal resistance measurement apparatus detects an anode alternating-current voltage generated between the anode electrode output terminal 11 and the intermediate terminal, as well as a cathode alternating-current voltage generated between the cathode electrode output terminal 12 and the intermediate terminal.

The internal resistance measurement apparatus calculates an internal resistance value on the basis of the anode alternating-current voltage, the cathode alternating-current voltage, and the alternating currents of the anode electrode output terminal 11 and the cathode electrode output terminal 12 while adjusting the amplitudes of the alternating currents so as to equalize the anode alternating-current voltage and the cathode alternating-current voltage.

The backflow prevention restriction unit 230A restricts an increase in the amplitude corresponding to a reduction in the pulsated pressure of anode gas attributed to the amplitude of the output current of the fuel cell stack 1 in the I-V estimation period.

The backflow prevention lower limit pressure holding unit 233 holds a backflow prevention lower limit pressure that has been set to restrict the amplitude corresponding to a reduction in the pulsated pressure of anode gas. The backflow prevention lower limit pressure holding unit 233 outputs the backflow prevention lower limit pressure to the pulsation lower limit pressure switching unit 234.

On the basis of a set value of the I-V estimation flag, the pulsation lower limit pressure switching unit 234 switches a pulsation lower limit pressure of anode gas from the voltage of cathode gas detected by the cathode pressure sensor 24 to the backflow prevention lower limit pressure. Note that the I-V estimation flag is set by the I-V estimation unit 220 as described using FIG. 3.

When the I-V estimation flag indicates "1," the pulsation lower limit pressure switching unit 234 determines that the fuel cell system 100 is in the I-V estimation period, obtains the backflow prevention lower limit pressure from the backflow prevention lower limit pressure holding unit 233, and outputs the same to the pulsation waveform computation unit 213 as the pulsation lower limit pressure.

On the other hand, when the I-V estimation flag indicates "0," the pulsation lower limit pressure switching unit 234 determines that the fuel cell system 100 is not in the I-V estimation period, and outputs the detected pressure output from the cathode pressure sensor 24 to the pulsation waveform computation unit 213 as the pulsation lower limit pressure.

On the basis of a target current of the fuel cell stack 1, the pulsation amplitude computation unit 211 computes a pulsation amplitude W1 that is necessary for discharging generated water associated with the electric power generation. The pulsation amplitude computation unit 211 corrects the pulsation amplitude W1 in accordance with the internal resistance of the fuel cell stack 1.

The pulsation amplitude computation unit 211 stores, beforehand, pulsation amplitude computation maps in one-to-one correspondence with internal resistance values. Each pulsation amplitude computation map indicates correspondence between the current of the fuel cell stack 1 and the pulsation amplitude of anode gas. Upon obtaining a target current and an internal resistance value, the pulsation amplitude computation unit 211 refers to a pulsation amplitude computation map specified by the obtained internal resistance value, and outputs a pulsation amplitude corresponding to the target current to the pulsation amplitude switching unit 232 as a target pulsation amplitude of the anode gas pressure.

The higher the target current, the larger the amount of generated water associated with the electric power generation, and hence the larger the pulsation amplitude W1 computed by the pulsation amplitude computation unit 211. Furthermore, the lower the wetness of the electrolyte membranes, the higher the internal resistance of the fuel cell stack 1, and hence the smaller the pulsation amplitude W1 computed by the pulsation amplitude computation unit 211.

The pulsation restriction amplitude holding unit 231 holds a value for restricting the pulsation amplitude W1 (hereinafter referred to as "pulsation restriction amplitude W2"). The pulsation restriction amplitude W2 has a smaller value than the pulsation amplitude W1. The pulsation restriction amplitude W2 is set to a value that allows nitrogen gas included in impurities retained in the fuel cell stack 1 to be discharged while preventing a backflow of impurities from the buffer tank 36 to the fuel cell stack 1. The pulsation restriction amplitude holding unit 231 outputs the pulsation restriction amplitude W2 to the pulsation amplitude switching unit 232.

On the basis of a set value of the I-V estimation flag, the pulsation amplitude switching unit 232 switches the target pulsation amplitude of the anode gas pressure from the pulsation amplitude W1 computed by the pulsation amplitude computation unit 211 to the pulsation restriction amplitude W2 held by the pulsation restriction amplitude holding unit 231.

When the I-V estimation flag indicates "1," the pulsation amplitude switching unit 232 determines that the fuel cell system 100 is in the I-V estimation period, obtains the pulsation restriction amplitude W2 from the pulsation restriction amplitude holding unit 231, and outputs the same to the pulsation upper limit pressure calculation unit 212 as the target pulsation amplitude.

On the other hand, when the I-V estimation flag indicates "0," the pulsation amplitude switching unit 232 determines that the fuel cell system 100 is not in the I-V estimation period, and outputs the pulsation amplitude W1 output from the pulsation amplitude computation unit 211 to the pulsation upper limit pressure calculation unit 212.

The pulsation upper limit pressure calculation unit 212 adds the target pulsation amplitude to the detected pressure output from the cathode pressure sensor 24, and outputs a value obtained from the addition to the pulsation waveform computation unit 213 as a pulsation upper limit pressure of anode gas.

As such, the backflow prevention restriction unit 230A restricts the pulsation amplitude W1 of the anode gas pressure to the pulsation restriction amplitude W2 in the I-V estimation period in which the I-V estimation unit 220 performs current control.

The pulsation waveform computation unit 213 computes the pulsated pressure of anode gas by selecting the pulsation upper limit pressure and the pulsation lower limit pressure of anode gas alternately so that the anode gas pressure has a pulsated waveform.

For example, when the pulsation upper limit pressure is selected, the pulsation waveform computation unit 213 calculates the pulsated pressure so that the anode gas pressure increases at a constant increase rate from the pulsation lower limit pressure to the pulsation upper limit pressure.

On the other hand, when the pulsation lower limit pressure is selected, the pulsation waveform computation unit 213 calculates the pulsated pressure so that the anode gas pressure decreases at a constant decrease rate from the pulsation upper limit pressure to the pulsation lower limit pressure. The pulsation waveform computation unit 213 outputs the calculated pulsated pressure of anode gas to the anode pressure regulator valve instruction unit 240 shown in FIG. 3 as the target pressure.

Figure 7:
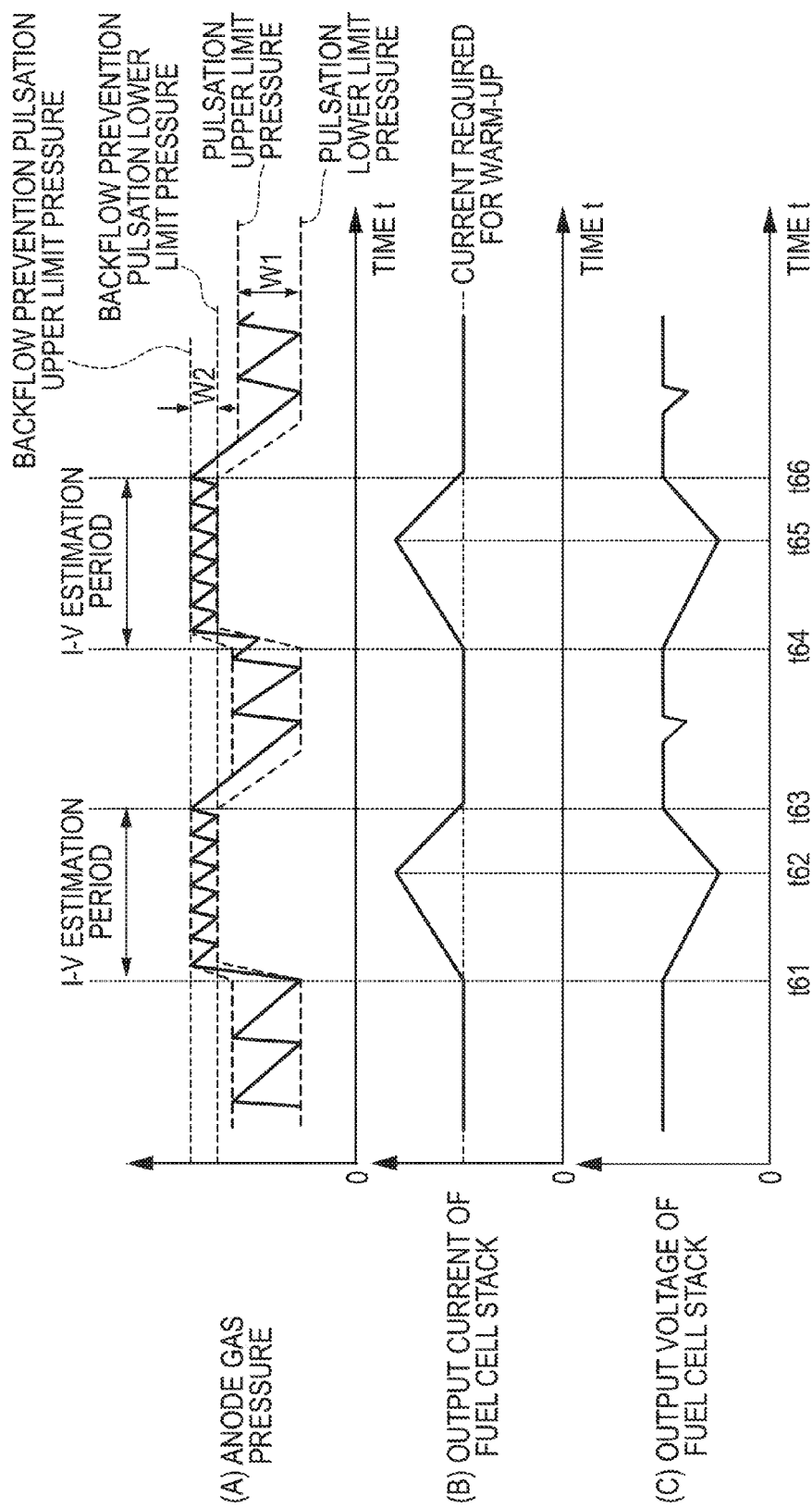
FIG. 7 is an explanatory diagram showing a method of restricting a reduction in the anode gas pressure at the time of I-V estimation.

FIG. 7 is an explanatory diagram showing a method of restricting the anode gas pressure implemented by the anode gas control unit 201.

FIG. 7(A) shows fluctuations in the pulsated pressure of anode gas during the pulsation operation. In FIG. 7(A), the pulsated pressure of anode gas is indicated by a solid line, and the pulsation upper limit pressure and the pulsation lower limit pressure are indicated by dash lines.

FIG. 7(B) shows the output current extracted from the fuel cell stack 1. FIG. 7(C) shows the output voltage of the fuel cell stack 1. Horizontal axes in FIGS. 7(A) to 7(C) represent a common time axis.

As with FIGS. 4(A) to 4(C), immediately before time t61, the warm-up facilitation operation is performed, and the fuel cell stack 1 supplies current only to the auxiliary machines 57 under voltage control by the DC/DC converter 56. Furthermore, due to the pulsation operation, nitrogen gas and generated water retained in the fuel cell stack 1 are ejected to and accumulated in the buffer tank 36.

As with FIGS. 4(A) to 4(C), the I-V estimation unit 220 performs current control in the I-V estimation period from time t61 to time t63, and in the I-V estimation period from time t64 to time t66. The I-V estimation unit 220 sets the I-V estimation flag to "1" in the I-V estimation period, and sets the I-V estimation flag to "0" outside the I-V estimation period.

Note that when the I-V estimation flag indicates "0," the detected pressure of cathode gas is set as the pulsation lower limit pressure, and a value obtained by adding the pulsation amplitude W1 to that pulsation lower limit pressure is set as the pulsation upper limit pressure.

At time t61, the I-V estimation unit 220 starts current control to increase the output current of the fuel cell stack 1 as shown in FIG. 7(B), and switches the I-V estimation flag from "0" to "1."

Once the I-V estimation flag has been switched to "1," the pulsation lower limit pressure switching unit 234 switches the pulsation lower limit pressure of anode gas from the detected pressure of cathode gas to the predetermined backflow prevention lower limit pressure that has been set to restrict the amplitude corresponding to a reduction in the anode gas pressure.

In addition, the pulsation amplitude switching unit 232 switches the target pulsation amplitude of the anode gas pressure from the pulsation amplitude W1 calculated by the pulsation amplitude computation unit 211 to the predetermined pulsation restriction amplitude W2 that has been set to prevent a backflow of impurities. Then, a value obtained by adding the pulsation restriction amplitude W2 to the backflow prevention lower limit pressure is set as the pulsation upper limit pressure.

In the I-V estimation period, the pulsation upper limit pressure is set to an anode gas pressure value that enables a supply of anode gas at the minimum flow rate necessary for increasing the output current of the fuel cell stack 1 to an upper limit value. Therefore, the larger the upper limit value of the output current in the I-V estimation period, the larger a set value of the pulsation upper limit pressure.

The pulsation restriction amplitude W2 is set to a predetermined pulsation amplitude that enables discharge of nitrogen gas retained in the anode gas flow passages formed inside the fuel cell stack 1.

Therefore, the backflow prevention lower limit pressure is fixed to a pressure value that does not cause a backflow of impurities from the buffer tank 36 while securing the pulsation restriction amplitude W2.

With an increase in the output current of the fuel cell stack 1, the pressure control unit 210 shown in FIG. 3 increases the target pressure of cathode gas, and hence the detected pressure of cathode gas output from the cathode pressure sensor 24 increases. Therefore, in FIG. 4(A), the pulsation lower limit pressure of anode gas increases.

In the current reduction period from time t62 to time t63, the anode gas pressure pulsates in accordance with the pulsation restriction amplitude W2 in a state where the pulsation lower limit pressure and the pulsation upper limit pressure of anode gas are fixed, regardless of current control by the I-V estimation unit 220.

This can prevent a reduction in the pulsation lower limit pressure of anode gas caused by a reduction in the detected pressure of cathode gas attributed to current control to reduce the output current shown in FIG. 4(A). Consequently, as shown in FIG. 7(A), the amplitude corresponding to a reduction in the pulsated pressure of anode gas is small in the I-V estimation period. This can suppress the internal pressure of the buffer tank 36 from exceeding the internal pressure of the fuel cell stack 1. Thus, a backflow of nitrogen gas from the buffer tank 36 to the fuel cell stack 1 can be prevented.

Because there is no backflow of nitrogen gas from the buffer tank 36 to the fuel cell stack 1, as shown in FIG. 7(C), the output voltage of the fuel cell stack 1 does not undergo a reduction indicated by the solid line in FIG. 4(C). The voltage sensor 52 accordingly detects an intended output voltage of the fuel cell stack 1. This enables accurate estimation of the I-V characteristic of the fuel cell stack 1.

Also in the I-V estimation period from time t64 to t66 following the elapse of a predetermined interval, the anode gas pressure pulsates in accordance with the pulsation restriction amplitude W2 in a state where the pulsation lower limit pressure and the pulsation upper limit pressure are fixed, similarly to the I-V estimation period from time t61 to time t63. Therefore, the I-V characteristic of the fuel cell stack 1 can be estimated without a backflow of impurities to the fuel cell stack 1. Note that the output voltage temporarily decreases in a period from time t63 to time t64, and following time t66, similarly to time t47 shown in FIGS. 4(A) to 4(C).

Figure 8:
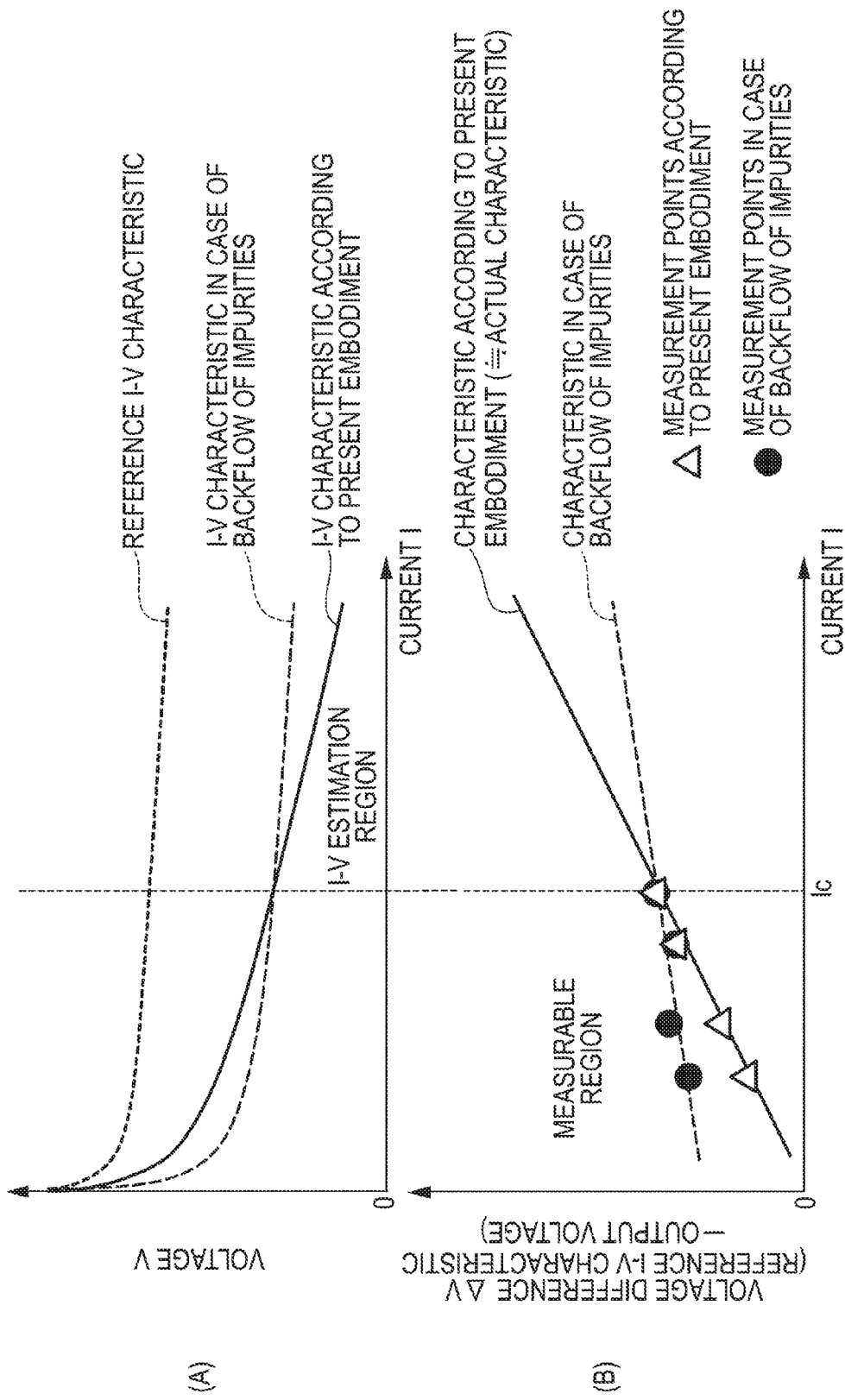
FIG. 8 is an explanatory diagram showing the precision of estimation of the I-V characteristic of the fuel cells.

FIG. 8 is an explanatory diagram related to a decline in the precision of estimation of the I-V characteristic associated with a backflow of impurities.

FIG. 8(A) shows the I-V characteristics of the fuel cell stack 1 estimated by the I-V estimation unit 220. In FIG. 8(A), the I-V characteristic of the fuel cell stack 1 according to the present embodiment is indicated by a solid line, the I-V characteristic obtained when impurities have flowed back from the buffer tank 36 is indicated by a dash line, and the reference I-V characteristic obtained during normal operation is indicated by a dot line. A vertical axis represents the output voltage V of the fuel cell stack 1, and a horizontal axis represents the output current I of the fuel cell stack 1.

FIG. 8(B) shows the characteristics of the fuel cell stack 1 obtained by approximating the I-V characteristics shown in FIG. 8(A) using expression (1) described using FIG. 2.

In FIG. 8(B), the characteristic of the fuel cell stack 1 according to the present embodiment is indicated by a solid line, and the characteristic of the fuel cell stack 1 obtained when impurities have flowed back from the buffer tank 36 is indicated by a dash line. A vertical axis represents a voltage difference $\Delta V$ obtained by subtracting a detected value of the output voltage from a voltage value of the reference I-V characteristic, and a horizontal axis represents the output current I of the fuel cell stack 1.

Note that an upper limit current Ic is a maximum value reached by the output current increased in the I-V estimation period, and is an upper limit value of a detectable range of the output current. A current range above the upper limit current Ic is the I-V estimation range estimated using expression (1).

As shown in FIG. 8(B), the inclination of a straight approximation line obtained when impurities have flowed back to the fuel cell stack 1 is larger than the inclination of a straight approximation line according to the present embodiment. That is to say, the coefficient "a" in expression (1) obtained when impurities have flowed back is smaller than the coefficient "a" obtained in the present embodiment.

This is due to the following reason: as a backflow of impurities leads to a decline in the efficiency of electric power generation by the fuel cell stack 1 and a reduction in the output voltage thereof toward the end of the I-V estimation period as shown in FIG. 4(C), the voltage difference $\Delta V$ increases as the output current decreases. Here, the voltage differences $\Delta V$ at the measurement points indicated by the first and second circles from the left are large.

Therefore, as shown in FIG. 8(A), the I-V characteristic estimated when impurities have flowed back is more favorable than the actual I-V characteristic of the fuel cell stack 1 in the I-V estimation range. This requires an increase in a threshold for permitting the vehicle to run in consideration of the foregoing issue, and hence makes it difficult to accurately permit the vehicle to run. In contrast, the I-V estimation unit 220 of the present embodiment can accurately estimate the I-V characteristic of the fuel cell stack 1 compared to a case in which impurities have flowed back.

According to the second embodiment of the present invention, the backflow prevention restriction unit 230A fixes the pulsation lower limit pressure of anode gas to a predetermined pressure (backflow prevention lower limit pressure) while the I-V estimation unit 220 is varying the output current of the fuel cell stack 1, that is to say, in the I-V estimation period.

In this way, in the I-V estimation period, the backflow prevention restriction unit 230A can prevent an increase in the amplitude corresponding to a reduction in the anode gas pressure. Accordingly, a backflow of nitrogen gas from the buffer tank 36 to the fuel cell stack 1 can be suppressed. This can suppress a decline in the precision of estimation of the I-V characteristic associated with a backflow of impurities while suppressing an increase in the concentration of impurities retained in the electric power generation regions in the fuel cell stack 1 with the use of the buffer tank 36.

Furthermore, in the present embodiment, the pulsation operation unit 210A causes the anode gas pressure to pulsate on the basis of the pulsation amplitude W1 necessary for discharging generated water associated with the electric power generation by the fuel cell stack 1. In the I-V estimation period, the backflow prevention restriction unit 230A restricts the pulsation amplitude W1 used by the pulsation operation unit 210A to the pulsation restriction amplitude W2 that is smaller than the pulsation amplitude necessary for discharging generated water. Note that the pulsation restriction amplitude W2 is set to the minimum pulsation amplitude necessary for discharging nitrogen gas.

In this way, nitrogen gas, which is an element other than generated water, can be discharged from the fuel cell stack 1 while suppressing a backflow of impurities accumulated in the buffer tank 36 in the I-V estimation period.

Furthermore, in the present embodiment, the I-V estimation unit 220 obtains the output current and the output voltage of the fuel cell stack 1 from the current sensor 51 and the voltage sensor 52 in the current reduction period in which the output current of the fuel cell stack 1 is reduced.

Should the output current and the output voltage be obtained in a period in which the output current of the fuel cell stack 1 is increased, due to the restoration of the I-V characteristic through warm-up, the voltage difference $\Delta V$ between the reference voltage of the reference I-V characteristic and the output voltage is likely to decrease with an increase in the output current. Therefore, the inclination "a" in expression (1) described using FIG. 2 decreases, and the estimated I-V characteristic is determined to be more favorable than the actual I-V characteristic. To address the foregoing issue, current may be extracted from the fuel cell stack 1 rapidly to increase the output current of the fuel cell stack 1 at a higher speed. However, this results in an abnormal reduction in the output voltage of the fuel cell stack 1.

For this reason, the output current and the output voltage of the fuel cell stack 1 are obtained in the current reduction period. Consequently, the precision of estimation of the I-V characteristic can be increased while preventing the fuel cell stack 1 from undergoing an abnormality.

The present embodiment has been described using an example in which the backflow prevention lower limit pressure is set during an increase and a reduction in the output current of the fuel cell stack 1 as shown in FIG. 7. Alternatively, the backflow prevention lower limit pressure may be set only in the current reduction period. In this case also, a decline in the precision of estimation of the I-V characteristic associated with a backflow of impurities accumulated in the buffer tank 36 can be suppressed. Furthermore, the water discharge performance of the fuel cell stack 1 can be improved by reducing a period in which the pulsation amplitude W1 is restricted, that is to say, increasing a period of pulsation based on the pulsation amplitude W1.

(Third Embodiment)

Figure 9:
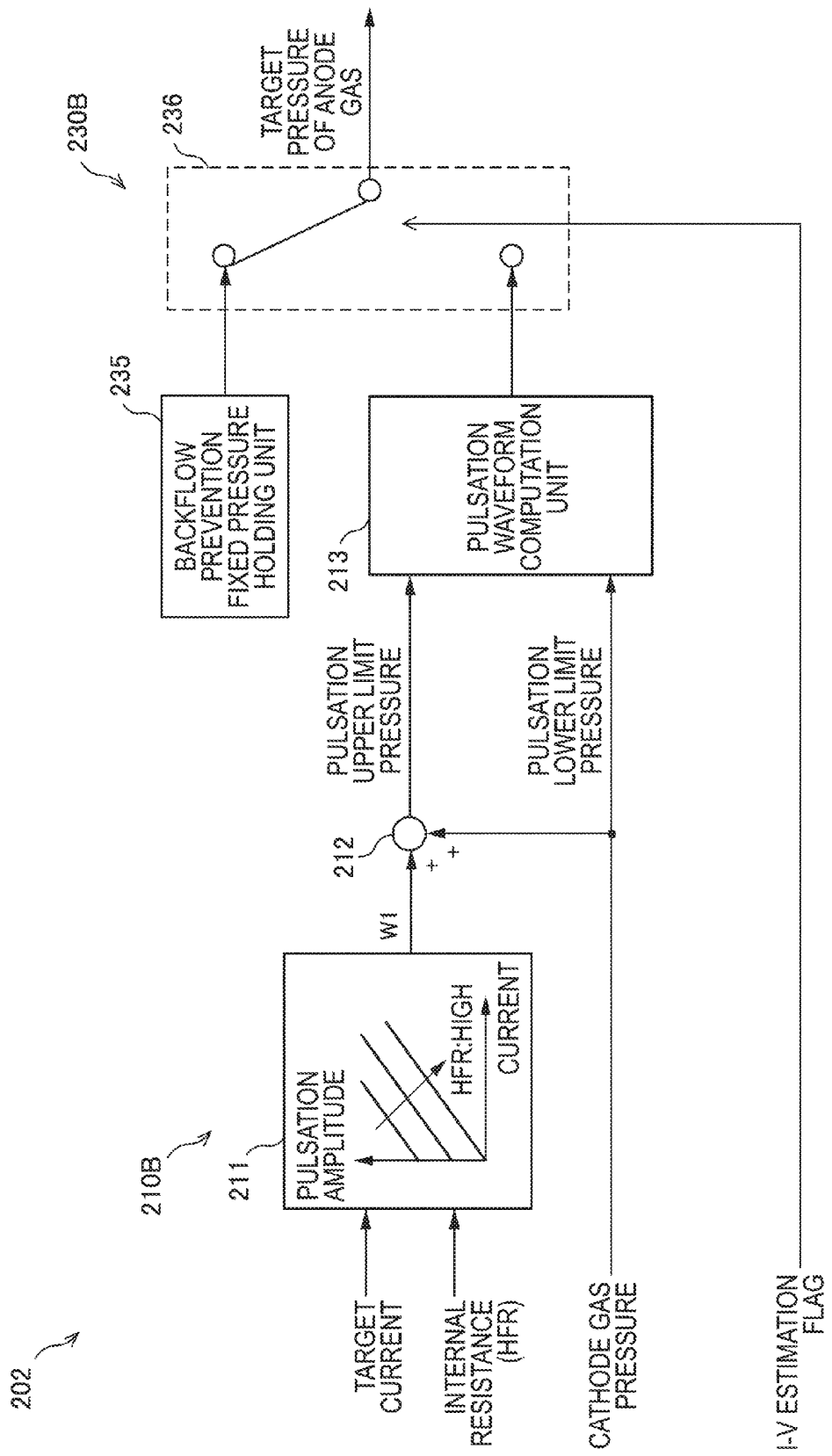
FIG. 9 is a block diagram showing an anode gas control unit according to a third embodiment.

FIG. 9 shows a configuration of an anode gas control unit 202 according to a third embodiment of the present invention. Note that a fuel cell system according to the present embodiment is basically configured in the same manner as the fuel cell system 100 shown in FIGS. 1 and 3. Below, components that are the same as those of the fuel cell system 100 are given the same reference signs thereas, and a detailed description thereof is omitted.

The anode gas control unit 202 has a function of controlling the pressure of anode gas to be supplied to the fuel cell stack 1 among the functions of the control unit 200 shown in FIG. 3.

The anode gas control unit 202 includes a pulsation operation unit 210B and a backflow prevention restriction unit 230B.

The pulsation operation unit 210B is basically configured in the same manner as the pulsation operation unit 210A shown in FIG. 6. Components that are the same as those of the pulsation operation unit 210A are given the same reference signs thereas, and a description thereof is omitted.

The backflow prevention restriction unit 230B includes a backflow prevention fixed pressure holding unit 235 and a target pressure switching unit 236.

The backflow prevention fixed pressure holding unit 235 holds a fixed value that has been set to fix the pulsated pressure of anode gas in the I-V estimation period (hereinafter referred to as "backflow prevention fixed pressure").

The backflow prevention fixed pressure is a pressure value that has been set to restrict a reduction in the anode gas pressure associated with current control by the I-V estimation unit 220. The backflow prevention fixed pressure holding unit 235 outputs the backflow prevention fixed pressure to the target pressure switching unit 236.

On the basis of a set value of the I-V estimation flag set by the I-V estimation unit 220 shown in FIG. 3, the target pressure switching unit 236 switches the target pressure of anode gas from the pulsated pressure computed by the pulsation waveform computation unit 213 to the fixed value held by the backflow prevention fixed pressure holding unit 235.

When the I-V estimation flag indicates "1," the target pressure switching unit 236 determines that the fuel cell system 100 is in the I-V estimation period, obtains the backflow prevention fixed pressure from the backflow prevention fixed pressure holding unit 235, and outputs the same to the anode pressure regulator valve instruction unit 240 shown in FIG. 3 as the target pressure.

On the other hand, when the I-V estimation flag indicates "0," the target pressure switching unit 236 determines that the fuel cell system 100 is not in the I-V estimation period, and outputs the pulsated pressure output from the pulsation waveform computation unit 213 to the anode pressure regulator valve instruction unit 240.

As such, the backflow prevention restriction unit 230B restricts the pulsated pressure of anode gas to the backflow prevention fixed pressure in the I-V estimation period in which the I-V estimation unit 220 performs current control.

Figure 10:
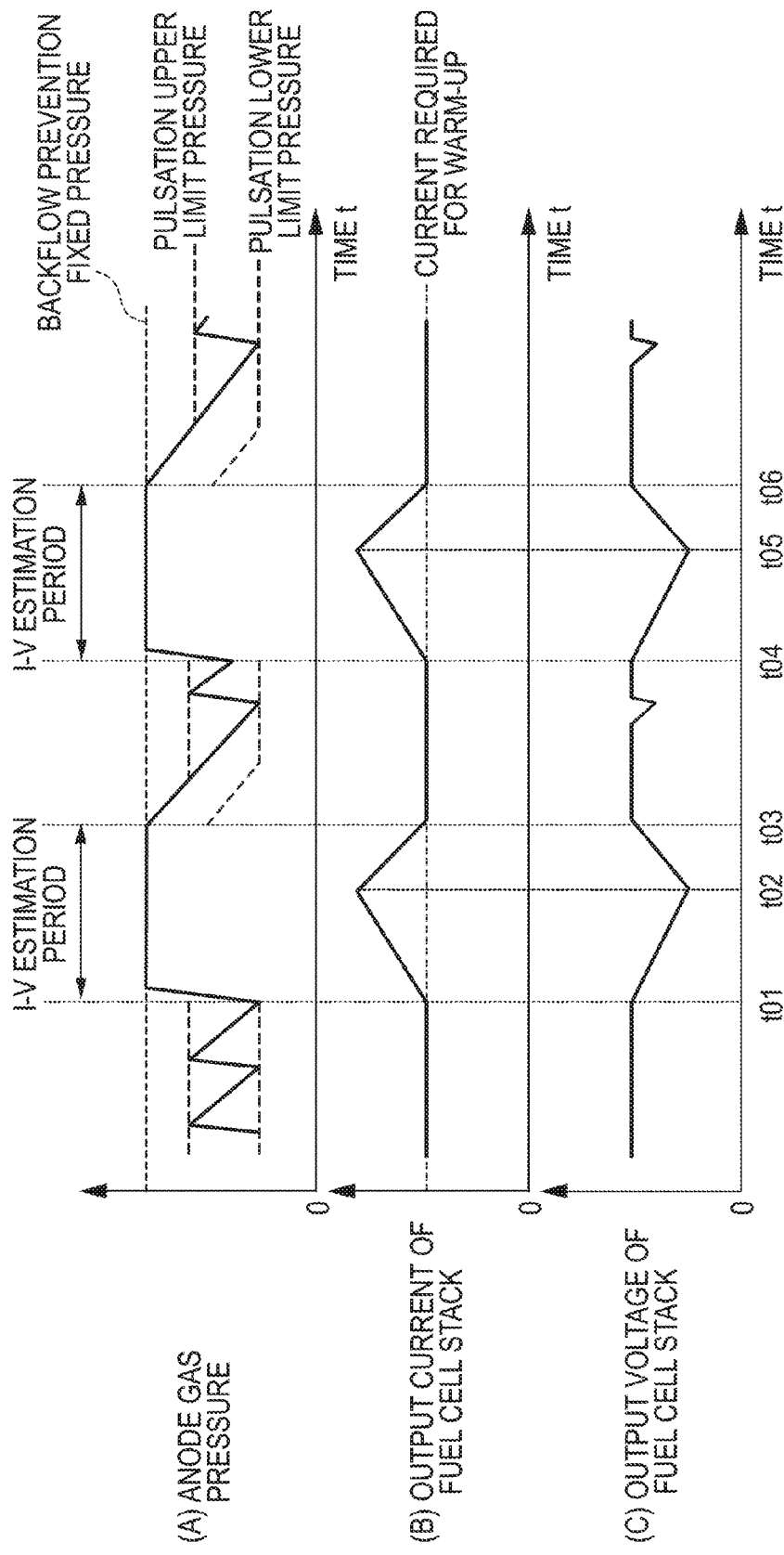
FIG. 10 is an explanatory diagram showing a method of restricting a reduction in the anode gas pressure at the time of I-V estimation.

FIG. 10 is an explanatory diagram showing a method of restricting the anode gas pressure implemented by the anode gas control unit 202. Note that vertical axes in FIGS. 10(A) to 10(C) are the same as vertical axes in FIGS. 7(A) to 7(C), respectively, and horizontal axes in FIGS. 10(A) to 10(C) represent a common time axis.

The I-V estimation unit 220 sets the I-V estimation flag to "1" in the I-V estimation period, and sets the I-V estimation flag to "0" outside the I-V estimation period. When the I-V estimation flag indicates "0," a detected value of the cathode gas pressure is set as the pulsation lower limit pressure, and a value obtained by adding the pulsation amplitude W1 calculated by the pulsation amplitude computation unit 211 to that pulsation lower limit pressure is set as the pulsation upper limit pressure.

At time t01, the I-V estimation unit 220 starts current control to increase the output current of the fuel cell stack 1 as shown in FIG. 10(B), and switches the I-V estimation flag from "0" to "1."

Once the I-V estimation flag has been switched to "1," the target pressure switching unit 236 switches the target pressure of anode gas from the pulsated pressure of cathode gas to the predetermined backflow prevention fixed pressure that has been set to restrict a reduction in the anode gas pressure.

Note that the backflow prevention fixed pressure is set to an anode gas pressure value that enables a supply of anode gas at the minimum flow rate that is necessary when the output current has been increased to an upper limit value in the I-V estimation period. Therefore, the larger the upper limit value of the output current in the I-V estimation period, the larger the set value of the backflow prevention fixed pressure.

As described above, in the I-V estimation period, the anode gas pressure is set to the backflow prevention fixed pressure, and thus a backflow of nitrogen gas from the buffer tank 36 to the fuel cell stack 1 can be prevented while supplying anode gas to the fuel cell stack 1 at the flow rate necessary for the electric power generation.

The voltage sensor 52 can accordingly detect an intended output voltage of the fuel cell stack 1. This enables accurate estimation of the I-V characteristic of the fuel cell stack 1. Also in the I-V estimation period from time t04 to time t06, the I-V characteristic of the fuel cell stack 1 can be estimated without a backflow of impurities to the fuel cell stack 1, similarly to the I-V estimation period from time t01 to time t03.

In the third embodiment of the present invention, the backflow prevention restriction unit 230B switches the anode gas pressure from the pressure pulsated by the pulsation operation unit 210B to a predetermined pressure (backflow prevention fixed pressure) during the I-V estimation period.

This can restrict a reduction in the anode gas pressure, and hence prevent a backflow of impurities from the buffer tank 36 to the fuel cell stack 1, in the I-V estimation period, similarly to the second embodiment. Therefore, a decline in the precision of estimation of the I-V characteristic can be suppressed.

Furthermore, outside the I-V estimation period, the precision of estimation of the I-V characteristic and the water discharge performance of the fuel cell stack 1 can both be secured by performing the pulsation operation on the anode gas pressure, similarly to the second embodiment. Moreover, the present embodiment can be realized using a simple configuration compared to the second embodiment.

Although the embodiments of the present invention have been described thus far, the above embodiments merely illustrate a part of example applications of the present invention, and the specific configurations of the above embodiments are not intended to limit the technical scope of the present invention.

Although the second and third embodiments have been described using an example in which the pulsation upper limit pressure is calculated on the basis of the pulsation lower limit pressure, the present invention is also applicable to a configuration in which the pulsation lower limit pressure is calculated on the basis of the pulsation upper limit pressure.

The above has described an example in which the pulsation operation is performed on the anode gas pressure. However, even if the pulsation operation is not performed, the anode gas pressure is reduced in association with current control by the I-V estimation unit 220, and thus the present invention can be applied. In this case also, the effects similar to the effects of the present embodiments can be achieved.

The present invention is also applicable to a fuel cell system including the cathode gas supply passage 21 provided with a humidifier, e.g., a water recovery device (WRD). In this case, the cathode pressure sensor 24 is provided in the cathode gas supply passage 21 so as to be located upstream relative to the humidifier, and the pressure detected by the cathode pressure sensor 24 is set as the pulsation lower limit pressure of anode gas.

Although the present invention has been described using an example in which the I-V estimation is performed during the warm-up facilitation operation, the I-V estimation may be performed during normal operation. In this case also, the effects similar to the effects of the present embodiments can be achieved.

Note that the above embodiments can be combined as appropriate.

The present application claims the benefit of priority from Japanese Patent Application No. 2013-211335, filed in the Japan Patent Office on Oct. 8, 2013, the disclosure of which is incorporated herein by reference in its entirety.

The invention claimed is:

1. A fuel cell system for supplying anode gas and cathode gas to a fuel cell and for causing the fuel cell to generate electric power in accordance with a load, the fuel cell system comprising:
    a container configured to reserve impurities discharged from the fuel cell;
    a pressure control unit configured to make a pressure of the anode gas higher when a current of the fuel cell is high than when the current of the fuel cell is low;
    an estimation unit configured to vary an amplitude of the current of the fuel cell, and estimate a current-voltage characteristic of the fuel cell on the basis of a current value and a voltage value obtained when the amplitude of the current of the fuel cell has been varied; and
    a restriction unit configured to, while the estimation unit is estimating the current-voltage characteristic, restrict a reduction made by the pressure control unit in the pressure of the anode gas.

2. The fuel cell system according to claim 1, wherein while the estimation unit is varying the current of the fuel cell, the restriction unit sets the pressure of the anode gas to a predetermined pressure.

3. The fuel cell system according to claim 2, wherein the predetermined pressure is set on the basis of an upper limit value for an increase made by the estimation unit in the current of the fuel cell.

4. The fuel cell system according to claim 2, wherein on a basis of the predetermined pressure, the restriction unit causes the pressure of the anode gas to pulsate in accordance with a predetermined pulsation restriction amplitude smaller than a pulsation amplitude necessary for discharging generated water included in the impurities.

5. The fuel cell system according to claim 4, wherein the pulsation restriction amplitude smaller than the pulsation amplitude necessary for discharging the generated water is a pulsation amplitude necessary for discharging nitrogen gas.

6. The fuel cell system according to claim 2, further comprising
    a pulsation operation unit configured to cause the pressure of the anode gas to pulsate in accordance with a pulsation amplitude necessary for discharging generated water associated with the generation of electric power, wherein
    while the estimation unit is varying the current of the fuel cell, the restriction unit switches the pressure of the anode gas from the pressure pulsated by the pulsation operation unit to the predetermined pressure.

7. The fuel cell system according to claim 2, wherein the estimation unit obtains the current value and the voltage value of the fuel cell when the current of the fuel cell is reduced, and
    while the estimation unit is reducing the current of the fuel cell, the restriction unit sets the pressure of the anode gas to the predetermined pressure.

8. A method of controlling a fuel cell system for supplying anode gas and cathode gas to a fuel cell, and for causing the fuel cell to generate electric power in accordance with a load, the fuel cell system including a container for reserving impurities discharged from the fuel cell, the method comprising:
    a pressure control step of making a pressure of the anode gas higher when a current of the fuel cell is high than when the current of the fuel cell is low;
    an estimation step of varying an amplitude of the current of the fuel cell, and estimating a current-voltage characteristic of the fuel cell on the basis of a current value and a voltage value obtained when the amplitude of the current of the fuel cell has been varied; and
    a restriction step of restricting, while the current-voltage characteristic is being estimated in the estimation step, a reduction made in the pressure control step in the pressure of the anode gas.

9. The fuel cell system according to claim 1, wherein the container is provided in an anode gas discharge passage.

* * * * *